US012602434B1

(12) United States Patent
Schilders

(10) Patent No.: US 12,602,434 B1
(45) Date of Patent: Apr. 14, 2026

(54) GRAPH-BASED MODELS WITH SIMULATED NODES

(71) Applicants:Infosys Limited, Bangalore (IN);
InvertIT Inc., Columbus, IN (US)

(72) Inventor: Steven Schilders, Columbus, IN (US)

(73) Assignees: Infosys Limited, Bangalore (IN);
InvertIT Inc., Columbus, IN (US)

( * ) Notice: Subject to any disclaimer, the term of this patent is extended or adjusted under 35 U.S.C. 154(b) by 0 days.

(21) Appl. No.: 19/046,738

(22) Filed: Feb. 6, 2025

(51) Int. Cl.
*G06F 16/901* (2019.01)
*G06F 16/21* (2019.01)

(52) U.S. Cl.
CPC ........ *G06F 16/9024* (2019.01); *G06F 16/211* (2019.01)

(58) Field of Classification Search
CPC ........................... G06F 16/9024; G06F 16/211
USPC ......................................................... 707/798
See application file for complete search history.

(56) References Cited

U.S. PATENT DOCUMENTS

| | | | | |
|---|---|---|---|---|
| 11,334,475 | B1 * | 5/2022 | Rabinowitz | ............... G06F 8/33 |
| 11,775,850 | B2 * | 10/2023 | Campos | ................ G06N 3/092 |
| | | | | 706/25 |
| 12,056,190 | B1 | 8/2024 | Schilders | |
| 12,164,569 | B2 | 12/2024 | Schilders | |
| 12,222,986 | B2 | 2/2025 | Schilders | |
| 12,229,191 | B2 | 2/2025 | Schilders | |
| 2022/0187847 | A1 * | 6/2022 | Cella | ................ G05B 19/41885 |
| 2024/0256603 | A1 | 8/2024 | Schilders | |
| 2024/0257417 | A1 | 8/2024 | Schilders | |
| 2025/0258708 | A1 * | 8/2025 | Crabtree | .............. G06F 9/5027 |

FOREIGN PATENT DOCUMENTS

| | | | | |
|---|---|---|---|---|
| CN | 107301128 | A * | 10/2017 | .......... G06F 11/3604 |
| CN | 117642737 | A * | 3/2024 | ........ G06F 21/6209 |
| WO | WO-02052410 | A1 * | 7/2002 | ............ G06F 9/465 |
| WO | WO-2023048747 | A1 * | 3/2023 | .......... G06Q 30/018 |

* cited by examiner

*Primary Examiner* — Kuen S Lu

(74) *Attorney, Agent, or Firm* — Finnegan, Henderson, Farabow, Garrett & Dunner, LLP

(57) ABSTRACT

An overlay system is provided that includes a storage element and processing circuitry coupled thereto. The storage element stores an executable graph-based model. The processing circuitry receives a stimulus associated with simulation of an object of an external system. The processing circuitry instantiates, in the executable graph-based model, a preliminary node for the object. The preliminary node is associated with a set of attributes. The processing circuitry maps, to the set of attributes, a set of attribute values associated with the object. Further, the processing circuitry instantiates, in association with the preliminary node, a simulation overlay node in the executable graph-based model. Based on the association with the simulation overlay node, the processing circuitry customizes the preliminary node. Further, based on the customization of the preliminary node, the processing circuitry generates a simulated node simulating the object.

20 Claims, 12 Drawing Sheets

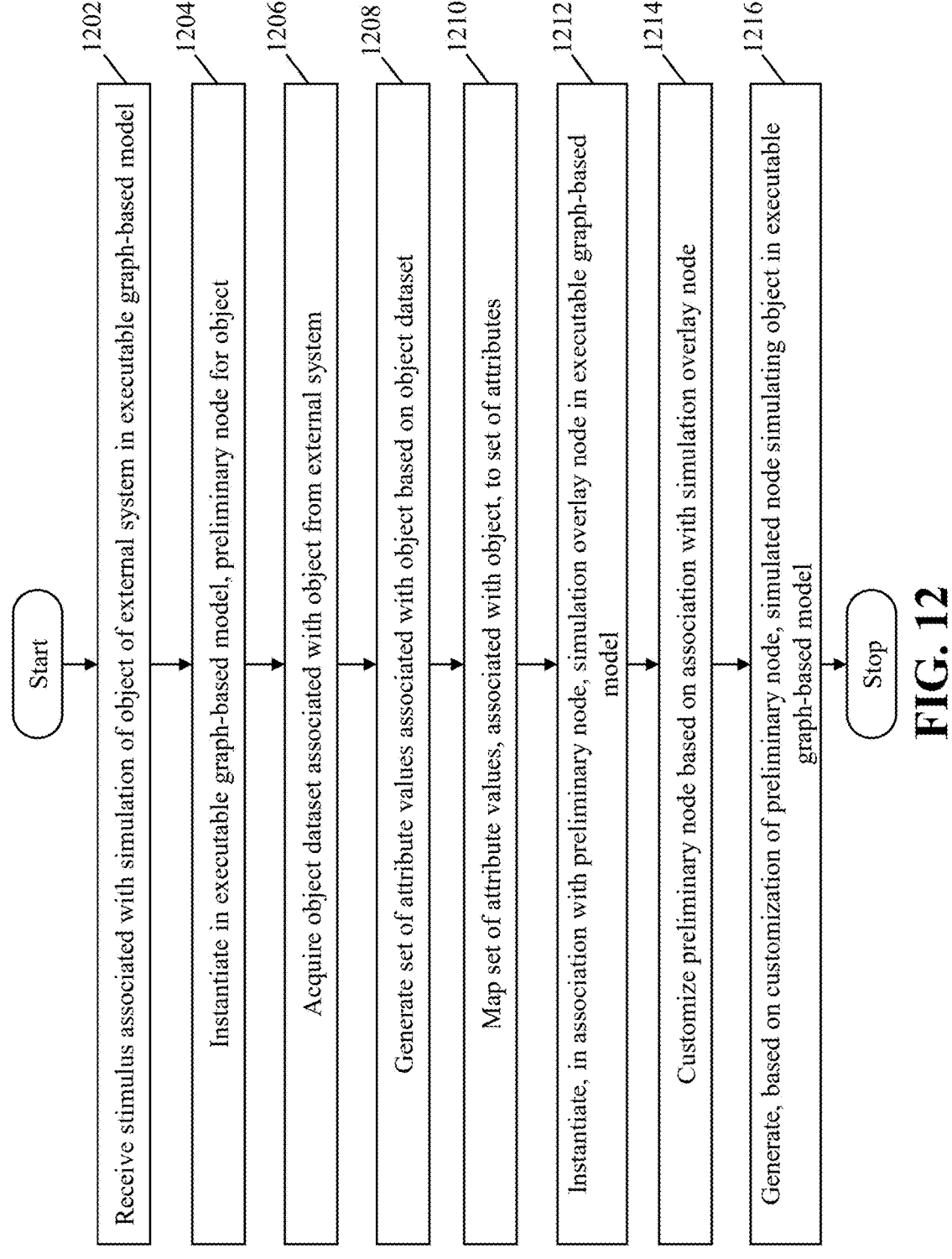

1200

1202 — Receive stimulus associated with simulation of object of external system in executable graph-based model 1204 — Instantiate in executable graph-based model, preliminary node for object 1206 — Acquire object dataset associated with object from external system 1208 — Generate set of attribute values associated with object based on object dataset 1210 — Map set of attribute values, associated with object, to set of attributes 1212 — Instantiate, in association with preliminary node, simulation overlay node in executable graph-based model 1214 — Customize preliminary node based on association with simulation overlay node 1216 — Generate, based on customization of preliminary node, simulated node simulating object in executable graph-based model

FIG. 12

GRAPH-BASED MODELS WITH SIMULATED NODES

FIELD OF THE DISCLOSURE

Various embodiments of the present disclosure relate generally to graph-based models. More specifically, various embodiments of the present disclosure relate to implementation of external systems in executable graph-based models with simulated nodes.

BACKGROUND

Exponential growth in the field of technology has led to digitization in various domains such as marketing, research and analysis, hospitality, medicine, or the like. Such digitization is performed by implementing the technologies using various computerized system architectures. Traditionally, in such system architectures, data storage is decoupled from functional data structures utilized during processing. This separation occurs both when data is "at rest" in persistent storage and during runtime, where various operations are executed on a copy of the relevant data in a distinct representation that is optimized for computation. This architectural division of data and processing logic often results in an impedance mismatch between the storage format and the processing format. In practical implementations, such separation enforced by the system architectures can severely inhibit the flexibility, extensibility, and responsiveness of associated technologies. Therefore, a suitable system architecture is required for accommodating the needs of the operations. However, transforming a system with an existing system architecture to a new system architecture may be a complex task, which makes such transformations complex and undesirable.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating implementation of external systems in executable graph-based models are provided substantially as shown in, and described in connection with, at least one of the figures.

Methods and systems disclosed herein facilitate implementation of an external system in the executable graph-based models and various operations associated with creation of simulated nodes and simulation overlay nodes for facilitating such implementation of the external system. An overlay system disclosed herein includes a storage element that is configured to store an executable graph-based model and processing circuitry that is coupled to the storage element. The processing circuitry is configured to receive a first stimulus associated with simulation of a first object of the external system in the executable graph-based model. The processing circuitry is further configured to instantiate, in the executable graph-based model, a first preliminary node for the first object. The first preliminary node interfaces the first object in the executable graph-based model. The first preliminary node is associated with a first set of attributes. The processing circuitry is further configured to map, to the first set of attributes, a first set of attribute values associated with the first object. The processing circuitry is further configured to instantiate, in association with the first preliminary node, a first simulation overlay node in the executable graph-based model. The processing circuitry is further configured to customize the first preliminary node based on the association with the first simulation overlay node. The processing circuitry is further configured to generate, based on the customization of the first preliminary node, a first simulated node simulating the first object in the executable graph-based model.

In some embodiments, to customize the first preliminary node, the processing circuitry is further configured to modify a node structure of the first preliminary node based on the first simulation overlay node.

In some embodiments, based on the first simulation overlay node being a vertex node-type overlay node, the node structure of the first preliminary node is modified to match a vertex node-type. Based on the first simulation overlay node being an edge node-type overlay node, the node structure of the first preliminary node is modified to match an edge node-type. Based on the first simulation overlay node being a role node-type overlay node, the node structure of the first preliminary node is modified to match a role node-type. Based on the first simulation overlay node being an overlay node-type overlay node, the node structure of the first preliminary node is modified to match an overlay node-type. Based on the first simulation overlay node being an attribute node-type overlay node, the node structure of the first preliminary node is modified to match an attribute object. Based on the first simulation overlay node being an attribute edge node-type overlay node, the node structure of the first preliminary node is modified to match an attribute edge.

In some embodiments, the node structure of the first preliminary node is modified based on a node-type of the first simulation overlay node.

In some embodiments, based on the association of the first simulation overlay node with the first preliminary node, the first simulation overlay node is associated with the first simulated node.

In some embodiments, the first simulated node includes a first overlay manager that manages the association of the first simulation overlay node with the first simulated node.

In some embodiments, the processing circuitry is further configured to acquire a first object dataset associated with the first object from the external system. The processing circuitry is further configured to generate the first set of attribute values associated with the first object based on the first object dataset.

In some embodiments, the first object is at least one of a group consisting of a data object or a function object. Based on the first object being the data object, the first object dataset pertains to non-executable data associated with the first object. Based on the first object being the function object, the first object dataset pertains to processing logic associated with the first object.

In some embodiments, based on the first object being the data object, the first simulation overlay node is one of a group consisting of: a vertex node-type overlay node, an edge node-type overlay node, a role node-type overlay node, an attribute overlay node, or an attribute edge overlay node. Based on the first object being the function object, the first simulation overlay node is an overlay node-type overlay node.

In some embodiments, the processing circuitry is further configured to determine a data organization schema associated with the external system. The processing circuitry is further configured to generate a first data template based on the data organization schema. The processing circuitry is further configured to generate a second data template based on a schema associated with the overlay system. The processing circuitry is further configured to map the first data template with the second data template. The first set of attribute values is generated further based on the mapping between the first data template and the second data template.

In some embodiments, the generation of the first set of attribute values is further based on a schema of the overlay system.

In some embodiments, the processing circuitry is further configured to receive a second stimulus associated with the first object. An operation associated with the second stimulus is to be executed based on the first object dataset associated with the first object. The processing circuitry is further configured to identify, based on the mapping with the first set of attributes, the first set of attribute values. The processing circuitry is further configured to execute the operation associated with the second stimulus based on the first set of attribute values.

In some embodiments, the first simulation overlay node is one of a group consisting of: a vertex node-type overlay node, an edge node-type overlay node, a role node-type overlay node, an overlay node-type overlay node, an attribute overlay node, or an attribute edge overlay node. The first simulated node is one of a group consisting of: a simulated vertex node, a simulated edge node, a simulated role node, a simulated overlay node, a simulated attribute object, or a simulated attribute edge.

In some embodiments, based on the first simulation overlay node being the vertex node-type overlay node, the first simulated node is the simulated vertex node. Based on the first simulation overlay node being the edge node-type overlay node, the first simulated node is the simulated edge node. Based on the first simulation overlay node being the role node-type overlay node, the first simulated node is the simulated role node. Based on the first simulation overlay node being the overlay node-type overlay node, the first simulated node is the simulated overlay node. Based on the first simulation overlay node being the attribute overlay node, the first simulated node is the simulated attribute object. Based on the first simulation overlay node being the attribute edge overlay node, the first simulated node is the simulated attribute edge.

In some embodiments, the processing circuitry is further configured to instantiate, in the executable graph-based model, a set of function overlay nodes. The processing circuitry is further configured to associate the set of function overlay nodes with at least one of a group consisting of the first simulated node or the first simulation overlay node, to extend a functionality thereof.

In some embodiments, the first simulated node includes a first overlay manager that manages the association of the set of function overlay nodes with the first simulated node.

In some embodiments, the first simulation overlay node includes a second overlay manager that manages the association of the set of function overlay nodes with the first simulation overlay node.

In some embodiments, the processing circuitry is further configured to generate a second set of attribute values for a second set of attributes associated with the first simulated node. The second set of attribute values conforms to a schema of the overlay system. The second set of attribute values is generated based on a set of data organization constraints associated with the schema of the overlay system. The first set of attributes and the second set of attributes, collectively, constitute the first simulated node.

In some embodiments, the first object corresponds to one of a group consisting of a single entity or a group of entities.

In some embodiments, the first simulated node includes one of a group consisting of a single preliminary node or a group of preliminary nodes.

In some embodiments, the first simulated node is one of a group consisting of a stateful node or a stateless node.

In some embodiments, based on the first simulated node being the stateful node, the first simulated node is persistent such that at least one of a group consisting of data or processing logic associated with the first simulated node persists in the storage element. Based on the first simulated node being the stateless node, the first simulated node is non-persistent such that at least one of the group consisting of the data or the processing logic associated with the first simulated node ceases to exist based on an unloading of the first simulated node.

In some embodiments, the processing circuitry is further configured to unload the first simulated node from the executable graph-based model based on an expiration of an idle time-interval threshold associated with the first simulated node. The idle time-interval threshold corresponds to a maximum time period for which the first simulated node remains unutilized.

In some embodiments, the processing circuitry is further configured to identify a second object associated with the first object. The processing circuitry is further configured to generate, based on the association of the second object with the first object, a second simulated node for the second object. The processing circuitry is further configured to associate the second simulated node with the first simulated node.

In some embodiments, the first object and the second object have a first object dataset and a second object dataset, respectively, associated therewith. The second simulated node is associated with the first simulated node based on an association of the second object dataset with the first object dataset.

In some embodiments, the second simulated node is associated with the first simulated node further based on one of a group consisting of (i) the first object inheriting the second object or (ii) the first object being dependent on the second object.

In some embodiments, based on the first object inheriting the second object, the first simulated node inherits the second simulated node. Based on the first object being dependent on the second object, the first simulated node is dependent on the second simulated node.

In some embodiments, based on unloading of the first simulated node, the processing circuitry is further configured to unload the second simulated node from the executable graph-based model.

In some embodiments, the processing circuitry is further configured to generate a composite structure encompassing the first simulated node and the second simulated node based on the association between the first simulated node and the second simulated node. The processing circuitry is further configured to instantiate, based on the first simulated node being encompassed within the composite structure, a group overlay node associated with the first simulated node. The association of the group overlay node with the first simulated node facilitates the inclusion of the first simulated node in the composite structure.

In some embodiments, the processing circuitry is further configured to receive a third stimulus associated with the first simulated node. The processing circuitry is further configured to execute an operation associated with the first simulated node based on the composite structure.

In some embodiments, the group overlay node is one of a group consisting of a leaf group overlay node or a composite overlay node.

In some embodiments, the composite structure corresponds to a hierarchical structure. Based on the first simulated node being a leaf node in the hierarchical structure, the group overlay node corresponds to a leaf group overlay node. Based on the first simulated node being a parent node in the hierarchical structure, the group overlay node corresponds to a composite overlay node.

In some embodiments, the processing circuitry is further configured to instantiate a contract overlay node associated with the composite structure. The contract overlay node implements access control associated with the composite structure.

In some embodiments, the access control associated with the composite structure corresponds to one of a group consisting of public access, private access, or protected access.

In some embodiments, the processing circuitry is further configured to receive a fourth stimulus associated with the first simulated node. The processing circuitry is further configured to determine whether the first simulated node is loaded in the executable graph-based model. The processing circuitry is further configured to load, based on the first simulated node being unloaded from the executable graph-based model, the first simulated node and a set of simulated nodes associated with the first simulated node in the executable graph-based model. The processing circuitry is further configured to execute an operation associated with the fourth stimulus based on the first simulated node and the set of simulated nodes.

In some embodiments, the first simulated node is one of a group consisting of a mutable node or an immutable node.

In some embodiments, the processing circuitry is further configured to generate one or more additional simulated nodes simulating one or more remaining objects of the external system, respectively, in the executable graph-based model. The generation of the first simulated node and the one or more additional simulated nodes facilitates an implementation of the external system using the executable graph-based model.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

FIG. 12 is a flowchart of a method for implementing an external system using the overlay system, consistent with disclosed embodiments of the present disclosure.

DETAILED DESCRIPTION

Figure 1:
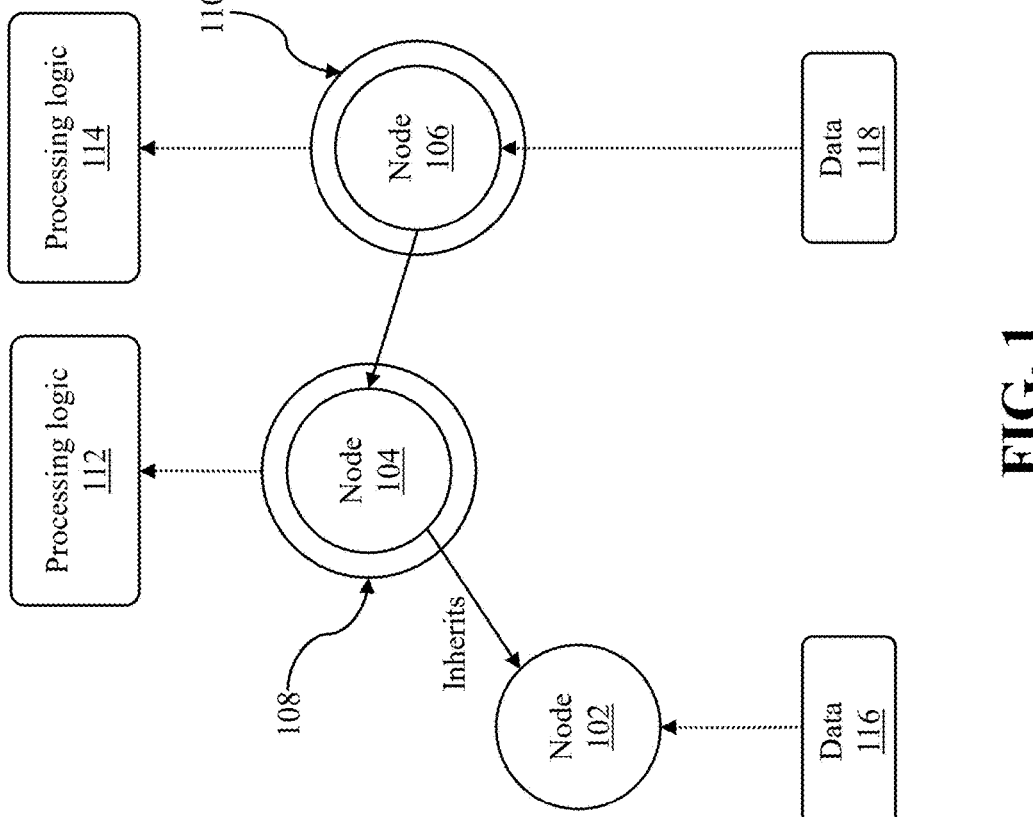
FIG. 1 is a graph that illustrates a composition of an executable graph-based model, consistent with disclosed embodiments of the present disclosure.
Figure 1:

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

The rapid advancements in technology have driven the digitization of processes and workflows across various domains, including marketing, research and analysis, hospitality, medicine, and others. This digitization is often achieved by employing computerized system architectures designed to optimize the functionality and scalability of modern technologies. Typically, in such computerized system architectures, the design principle has been to decouple data storage from the functional data structures used during processing. This decoupling exists in two distinct states: when data is "at rest" in persistent storage and during runtime when operations are performed on a copy of the relevant data in a format optimized for computation. For example, data stored in relational databases or flat files often needs to be transformed into in-memory data structures, such as arrays or objects, to facilitate efficient processing. This separation, while beneficial for modularity and storage optimization, introduces a significant challenge known as impedance mismatch. The disparity between the storage format and the processing format necessitates complex mappings and transformations to enable interaction between the two states. These transformations are not only computationally expensive but also increase the system complexity, requiring specialized middleware or data management solutions to handle these interactions effectively.

From the perspective of technologies being digitized, this architectural division can present several disadvantages. For example, it limits flexibility, as adapting the system to accommodate new data types or changes in data structure often requires extensive modifications to both storage and processing layers. It also reduces extensibility, as introducing new features or functionalities may necessitate significant re-engineering to bridge the gap between storage and processing formats. Further, the separation negatively impacts responsiveness, as the constant need for transformations introduces latency in real-time data processing, which is critical for applications requiring high-speed or real-time analytics. In the context of digitized technologies, these limitations can hinder innovation and operational efficiency, as the system's ability to quickly adapt to evolving requirements or incorporate new advancements is constrained. As a result, overcoming the challenges posed by this separation is essential to unlocking the full potential of digitized technologies and enabling seamless, efficient, and adaptive system designs. However, transformation from an existing computerized system architecture to a new architecture may be complex, time-consuming, and cost-intensive. Also, such transformation may often lead to data loss and hence, may be undesirable.

The present disclosure is directed to implementation of technologies by way of an executable graph-based model of an overlay system. The executable graph-based model is a customized hypergraph with hyper-edges that are realized by way of executable nodes. Each executable node is associated with a particular node-type. For example, an edge node corresponds to a base node with an edge node-type. Nodes (for example, base nodes and executable nodes) are connected with other nodes by way of roles included in an edge node therebetween. In some embodiments, roles are represented by way of nodes of role node-type. A role node between two nodes may be indicative of a context regarding an association therebetween. The executable graph-based model also includes a plurality of overlay nodes that incorporate in-situ features (for example, modification of signals) in the overlay system. Each overlay node is associated with one or more nodes (for example, a vertex node, an edge node, or the like) of the executable graph-based model and includes a corresponding processing logic that when executed implements a functionality thereof on the associated nodes. Hence, the processing logic is implemented within the executable graph-based model and is not required to be retrieved from any external system.

The overlay system disclosed herein facilitates simulated nodes in the executable graph-based model. The simulated nodes simulate/interface one or more objects (for example, data and/or processing logic) of an external system to be implemented using the executable graph-based model. For simulating an object of an external system in the executable graph-based model, processing circuitry of the overlay system may generate a preliminary node in the executable graph-based model. The preliminary node may interface the object in the executable graph-based model. The preliminary node is a node that has a node structure but an undetermined node-type. The processing circuitry may further associate the preliminary node with a simulation overlay node. The simulation overlay node is an overlay node of the executable graph-based model that includes processing circuitry that is executed on the associated preliminary node. Based on the association with the simulation overlay node, the processing circuitry may customize the node structure of the preliminary node. Based on the customization of the node structure, the undetermined node-type of the preliminary node transforms to a vertex node-type, an edge node-type, an overlay node-type, an attribute node-type, or an attribute edge node-type. In an instance when the object corresponds to data associated with the external system, the undetermined node-type transforms to the vertex node-type, the edge node-type, the attribute node-type, or the attribute edge node-type. In another instance when the object corresponds to processing logic associated with the external system, the undetermined node-type may transform to the overlay node-type. Such simulation of other remaining objects of the external system may lead to implementation of the external system using the executable graph-based model of the overlay system.

Presently, the system architectures support separate storage of the data and processing logic. This allows the processing logic to be executed on a copy of relevant data. However, such separation of data and processing logic forms an inhibitory approach as it leads to a significant increase in cost complexity, time complexity, processing complexity, latency, turn-around time, or the like. However, transforming the system architecture to reduce such disadvantages may be complex and cost intensive. The overlay system disclosed provides a seamless approach for implementing an external system using the executable graph-based model that significantly reduces the abovementioned disadvantages. The systems and methods disclosed herein implement data and processing logic as nodes of the executable graph-based model. Hence, the overlay system allows for an integrated approach for implementing data and processing logic while maintaining separation thereof when "at rest". Therefore, technologies implemented by way of the executable graph-based models support the integrated approach for implementing data and processing logic. Consequently, such technologies exhibit significant improvement in cost complexity, time complexity, processing complexity, latency, turn-around time, or the like. Further, in order to implement the external system, the overlay system allows for generation of simulated nodes that simulate objects of the external system. Such generation of the simulated nodes may be performed without making any changes to an original/initial state of the objects of the external system.

Notably, the present disclosure facilitates implementation of various external systems by way of the overlay system. The disclosed embodiments provide a range of advantages, including a simplified and user-friendly implementation of an executable graph-based model, which facilitates the implementation of external systems through an overlay system. The described systems and methods enable the simulation of objects associated with external systems within the executable graph-based model. This simulation capability allows for effective implementation of external systems via the overlay system. By leveraging the features of the overlay system, the external systems can benefit from significantly enhanced throughput and efficiency, along with notable reductions in cost, processing complexity, time complexity, latency, waiting periods, turnaround time, and other related metrics. Further, the systems and methods disclose a process of implementing the external systems by way of the overlay system. The process includes simulation of objects associated with the external systems in the executable graph-based model by interfacing the objects in the executable graph-based model by way of corresponding simulated nodes. The process also preserves original architectures of the external systems.

FIGURE DESCRIPTION

FIG. 1 is a graph that illustrates a composition of an executable graph-based model 100, consistent with disclosed embodiments of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlay nodes 108 and 110, respectively. Although not shown, the node 102 can be similarly extended with processing logic via the use of one or more overlays. Each overlay includes processing logic, such as processing logic 112 and 114 which are associated with the overlay nodes 108 and 110, respectively. At run-time, data, such as data 116 and 118, is associated with the nodes 102 and 106, respectively. Further, the overlay nodes 108 and 110 of the nodes 104 and 106, respectively, provide the functionality to respond to stimuli and interact with, manipulate, or otherwise process the data based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2). Throughout the description, the terms "overlay node" and "overlay" are used interchangeably.

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 applies to a range of time-critical systems where efficient processing of the stimuli is required.

Figure 2:
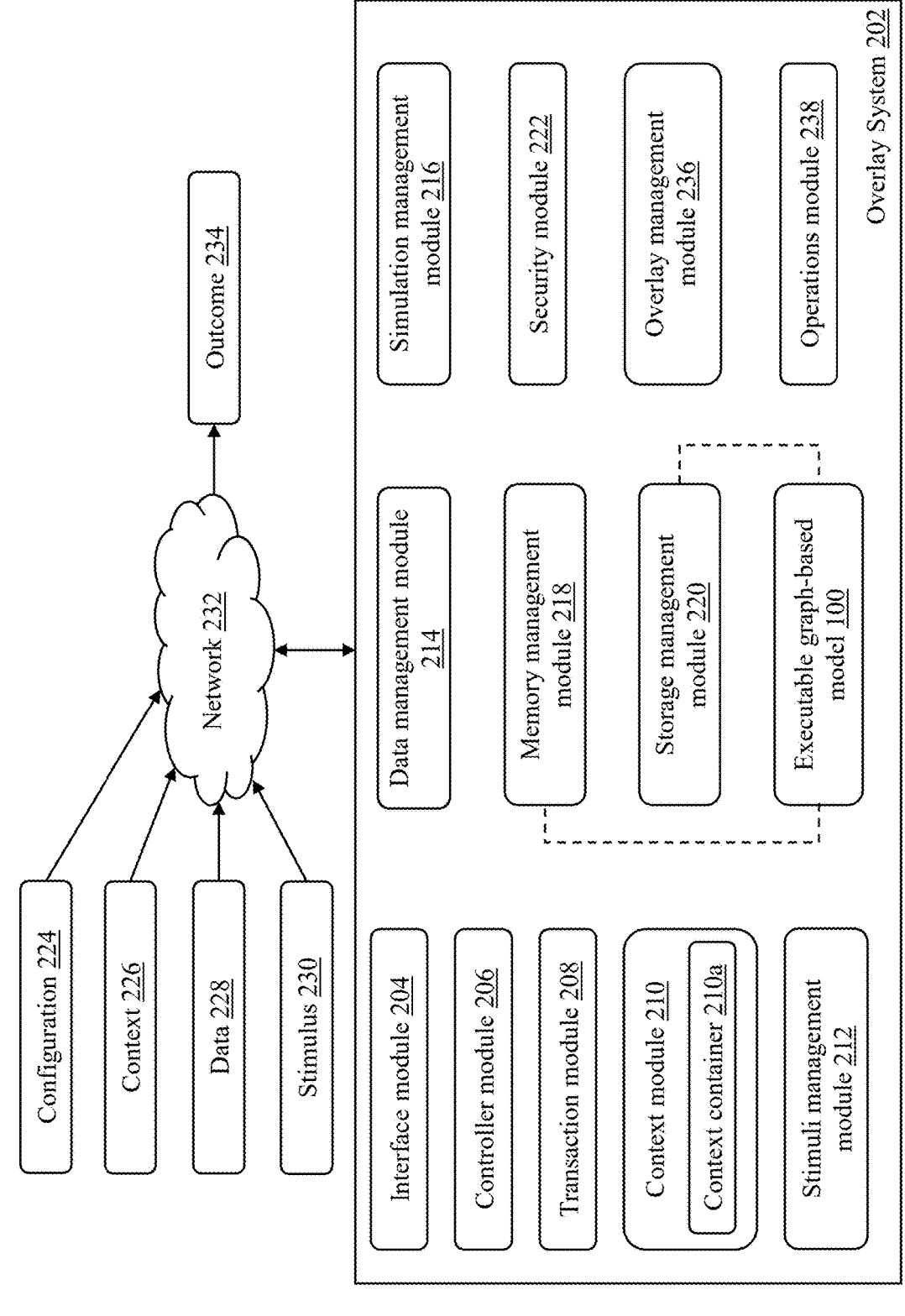
FIG. 2 is a block diagram that illustrates a system environment of an overlay system for execution, management, and configuration of the executable graph-based model, consistent with disclosed embodiments of the present disclosure.

FIG. 2 is a block diagram that illustrates a system environment 200 of an overlay system 202 for execution, management, and configuration of the executable graph-based model 100, consistent with disclosed embodiments of the present disclosure. Referring to FIG. 2, the overlay system 202 includes the executable graph-based model 100. The overlay system 202 further includes an interface module 204, a controller module 206, a transaction module 208, a context module 210, a stimuli management module 212, a data management module 214, a simulation management module 216, a memory management module 218, a storage management module 220, and a security module 222. FIG. 2 further shows a configuration 224, a context 226, data 228, a stimulus 230, a network 232, and an outcome 234. Additionally, the overlay system 202 of the present disclosure includes an overlay management module 236 and an operations module 238. In some embodiments, all the modules of the overlay system 202 except for the executable graph-based model 100 may collectively form processing circuitry that facilitates operations associated with a plurality of nodes including preliminary nodes, simulation overlay nodes, and simulated nodes, in the executable graph-based model 100. A preliminary node refers to a node that may have a node structure but may not have a node-type, as described in conjunction with FIG. 3. A preliminary node may be created for an object of an external system that may have to be simulated (namely, implemented) by way of the executable graph-based model 100. The external system is not shown in FIG. 2 to keep the illustration concise and clear and should not be considered a limitation of the present disclosure. The preliminary node may act as an interface for the object of the external system within the overlay system 202. In order to simulate the object, being interfaced by the preliminary node, in the executable graph-based model 100, the preliminary node may be associated with the simulation overlay node. The association with the simulation overlay node may cause the node structure of the preliminary node to be modified such that the preliminary node transforms into the simulated node. The simulated node may refer to an executable node that may simulate the object within the executable graph-based model 100. The simulated node may be instantiated within the executable graph-based model 100 such that it may create an illusion of the object being a part of the executable graph-based model 100 and the overlay system 202.

The overlay system 202 may include suitable logic, circuitry, interfaces, and/or code, executable by the circuitry, that may be configured to facilitate one or more operations associated with the nodes in the executable graph-based model 100.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. The configuration 224, the context 226, the data 228, and the stimulus 230 may be received by the interface module 204 via the network 232. Similarly, outputs (e.g., the outcome 234) produced by the overlay system 202 are passed by the interface module 204 to the network 232 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the stimulus 230) and their associated contexts (such as the context 226) provide the basis for all interactions within the executable graph-based model 100. Processing of such stimuli may lead to execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 230) and processes them based on a corresponding context (e.g., the context 226). The context 226 determines the priority that is to be assigned to the processing of the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in an event of an expected or unexpected software or hardware fault or failure. The controller module 206 is configured to handle the processing of the stimulus 230 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture, whereby the stimulus 230 within the overlay system 202 is associated with the context 226 which is used to adapt the handling or processing of the stimulus 230 by the overlay system 202. That is to say that the handling or processing of the stimulus 230 is done based on the context 226 associated therewith. Hence, the stimulus 230 is a contextualized stimulus. The context 226 may include details such as username, password, access token, device information, time stamp, one or more relevant identifiers (IDs), or the like, that are required for processing of the stimulus 230 within the executable graph-based model 100. Each context within the overlay system 202 may be extended to include additional information that is required for the processing of the stimulus (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the context 226) and translating the received context to an operation execution context. In some examples, the operation execution context is larger than the received context because the context module 210 supplements the received context with further information necessary for the processing of the received context. The context module 210 passes the operation execution context to one or more other modules within the overlay system 202 to drive communication of data associated with the operation execution context. Contexts within the overlay system 202 can be external or internal. While some contexts apply to all application areas and problem spaces, some applications may require specific contexts to be generated and used to process the received stimulus 230. As will be described in more detail below, the executable graph-based model 100 is configurable (e.g., via the configuration 224) so as only to execute within a given execution context for a given stimulus.

As shown, the context module 210 includes a context container 210a that includes a set of defined contexts. Each defined context of the set of defined contexts pertains to a context that is associated with one or more operations for facilitating application and management of the plurality of nodes (for example, the preliminary nodes and/or the simulated nodes) in the overlay system 202. That is to say that one or more contexts of the set of defined contexts are indicative of the one or more operations to be executed by way of one or more simulated nodes in the overlay system 202. The one or more operations are executed when a context of a corresponding stimuli matches one of the set of defined contexts.

The stimuli management module 212 may include suitable logic, circuitry, interfaces, and/or code, executable by the circuitry, configured to process externally received stimuli (e.g., the stimulus 230) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as the stimulus 230) can be either externally or internally generated. In an example, the stimulus 230 may be a message that is internally triggered (e.g., generated) from any of the modules within the overlay system 202. Such internal generation of the stimulus 230 indicates that something has happened within the overlay system 202 and subsequent handling by one or more other modules within the overlay system 202 may be required. Internal stimulus 230 can also be triggered (e.g., generated) from the execution of processing logic associated with overlays within the executable graph-based model 100. In another example, the stimulus 230 may be externally triggered and may be generated based on an input received via a user interface associated with the controller module 206. The externally triggered stimulus 230 may be received in the form of a signal, a textual, audio, or visual input. The externally triggered stimulus 230 may be associated with the intent of a user to execute an operation indicated by the stimulus 230. The operation is executed in accordance with information included in the context 226 associated with the stimulus 230.

The stimuli management module 212 may receive the stimuli (such as the stimulus 230) in real-time or near-real-time and communicate the received stimuli to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of data associated with each stimulus. In one embodiment, the stimuli management module 212 processes the received stimuli in accordance with a predetermined configuration (e.g., the configuration 224) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change based on processing of data by any of its nodes. In some examples, the processing of a stimulus (such as the stimulus 230) results in the generation, communication, or processing of data that further results in one or more outcomes (e.g., the outcome 234) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 238 of the overlay system 202.

The data management module 214 may include suitable logic, circuitry, interfaces, and/or code, executable by the circuitry, configured to manage all data or information within the overlay system 202 (e.g., the data 228) for a given application. Operations performed by the data management module 214 include data loading, data unloading, data modeling, and data processing. The data management module 214 is communicatively coupled (e.g., connected either directly or indirectly) to one or more other modules within the overlay system 202 to complete some or all of these operations. For example, data storage is handled by the data management module 214 in conjunction with the memory management module 218 and the storage management module 220.

The simulation management module 216 may include suitable logic, circuitry, interfaces, and/or code, executable by the circuitry, configured to facilitate simulation of objects of external systems within the overlay system 202. In other words, the simulation management module 216 may be configured to execute one or more operations associated with generation and maintenance of one or more simulated nodes for one or more objects of the external systems. The simulation management module 216 may be further configured to facilitate one or more operations associated with creation, maintenance, deletion, rollback, modification, or the like associated with the simulated nodes.

The memory management module 218 may include suitable logic, circuitry, interfaces, and/or code, executable by the circuitry, configured to manage and optimize the memory usage of the overlay system 202. The memory management module 218 thus helps to improve the responsiveness and efficiency of the processing performed by one or more of the modules within the overlay system 202 by optimizing the memory handling performed by these modules. The memory management module 218 uses direct memory or some form of distributed memory management architecture (e.g., a local or remote caching solution). Additionally, or alternatively, the memory management module 218 deploys multiple different types of memory management architectures and solutions (e.g., reactive caching approaches such as lazy loading or a proactive approach such as write-through cache may be employed). These architectures and solutions are deployed in the form of a flat (single-tiered) or multi-tiered caching architecture where each layer of the caching architecture can be implemented using a different caching technology or architecture solution approach. In such implementations, each cache or caching tier can be configured (e.g., by the configuration 224) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 218 is communicatively coupled (e.g., connected either directly or indirectly) to one or more overlays within the executable graph-based model 100.

The storage management module 220 may include suitable logic, circuitry, interfaces, and/or code, executable by the circuitry, configured to manage the temporary or permanent storage of data associated with the overlay system 202. The storage management module 220 is any suitable low-level storage device solution (such as a file system) or any suitable high-level storage technology such as another database technology (e.g., relational database management system (RDBMS) or NoSQL database). The storage management module 220 is directly connected to the storage device upon which the relevant data is persistently stored. For example, the storage management module 220 can directly address the computer-readable medium (e.g., hard disk drive, external disk drive, or the like) upon which the data is being read or written. Alternatively, the storage management module 220 is connected to the storage device via a network such as the network 232. As will be described in more detail later in the present disclosure, the storage management module 220 uses manifests to manage the interactions between the storage device and the modules within the overlay system 202. In one embodiment, the storage management module 220 is communicatively coupled (e.g., connected either directly or indirectly) to one or more overlays within the executable graph-based model 100. Throughout the description, the term 'storage device' is used interchangeably with the term 'storage element'.

As described, storage, loading, and unloading of the executable graph-based model 100 or one or more components thereof is facilitated by the memory management module 218 and the storage management module 220. The memory management module 218 and the storage management module 220 may facilitate such operations by interacting with the storage device that stores the executable graph-based model 100. The overlay system 202 further includes a plurality of manifest storages. The manifest storages are used by the memory management module 218 and the storage management module 220 to facilitate storage manifest states (including manifest template states and manifest instance states) of nodes. The storage element may include a primary storage and a secondary storage. The primary storage may store the executable graph-based model 100 and may also store nodes that are loaded in the executable graph-based model 100. The secondary storage may store node states, manifests, and manifest states associated with nodes that are unloaded from the executable graph-based model 100. Storage and retrieval of nodes are described in detail in conjunction with FIG. 5.

The security module 222 may include suitable logic, circuitry, interfaces, and/or code, executable by the circuitry, configured to manage the security of the overlay system 202. This includes the security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 222 can enforce a hypertext transfer protocol secure (HTTPS) protocol with the necessary certification. As a further example, if the data or information associated with the data associated with the overlay system 202 contains Personally Identifiable Information (PII) or Protected Health Information (PHI), the security module 222 can implement one or more layers of data protection to ensure that the PII or PHI are correctly processed and stored. In an additional example, in implementations whereby the overlay system 202 operates on United States of America citizen medical data, the security module 222 may enforce additional protections or policies as defined by the United States Health Insurance Portability and Accountability Act (HIPAA). Similarly, if the overlay system 202 is deployed in the European Union (EU), the security module 222 may enforce additional protections or policies to ensure that the data processed and maintained by the overlay system 202 complies with the General Data Protection Regulation (GDPR). In one embodiment, the security module 222 is communicatively coupled (e.g., connected either directly or indirectly) to one or more overlays within the executable graph-based model 100, thereby directly connecting security execution to the data/information in the executable graph-based model 100. The security module 222 thus acts as a centralized coordinator that works in conjunction with the overlay management module 236 for managing and executing security-based overlays.

The overlay management module 236 may include suitable logic, circuitry, interfaces, and/or code, executable by the circuitry, configured to manage all overlays within the overlay system 202. Operations performed by the overlay management module 236 include overlay storage management, overlay structure modeling, overlay logic creation and execution, and overlay loading and unloading (within the executable graph-based model 100). The overlay management module 236 is communicatively coupled (e.g., connected either directly or indirectly) to one or more other modules within the overlay system 202 to complete some or all of these operations. For example, overlays can be persisted in some form of physical storage using the storage management module 220 (as described in more detail below). As a further example, overlays can be compiled and preloaded into memory via the memory management module 218 for faster run-time execution.

The operations module 238 may include suitable logic, circuitry, interfaces, and/or code, executable by the circuitry, configured to track operational metrics and the behavior of all modules of the overlay system 202. Operational metrics of a module are indicative of statistics associated with the performance of the module while performing an operation (for example, communication, data processing, stimulus processing, or the like).

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. Such a module as a unit or in combination with one or more other modules of the overlay system 202 may form processing circuitry of the overlay system 202.

Beneficially, various features of the overlay system 202 support the processing circuitry and a computing system (shown in FIG. 11) implementing the overlay system in significantly enhancing its performance. The significant enhancement in performance may include significantly increased throughput and efficiency, as well as significantly reduced cost complexity, processing complexity, time complexity, latency, waiting time, turnaround time, or the like.

The overlay system 202 may be implemented in software, hardware, or a combination of both software and hardware. Examples of suitable hardware modules include, but are not limited to, a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or functional programming languages.

Although it is described that the overlay system 202 includes a single executable graph-based model (e.g., the executable graph-based model 100), the scope of the present disclosure is not limited to it. In other embodiments, the overlay system 202 may include more than one executable graph-based model, without deviating from the scope of the present disclosure. In such a scenario, each executable graph-based model is implemented and managed in a manner that is similar to the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the executable graph-based model 100) are implemented as nodes. As will become clear, this allows executable graph-based models to be flexible, extensible, and highly configurable.

Figure 3:
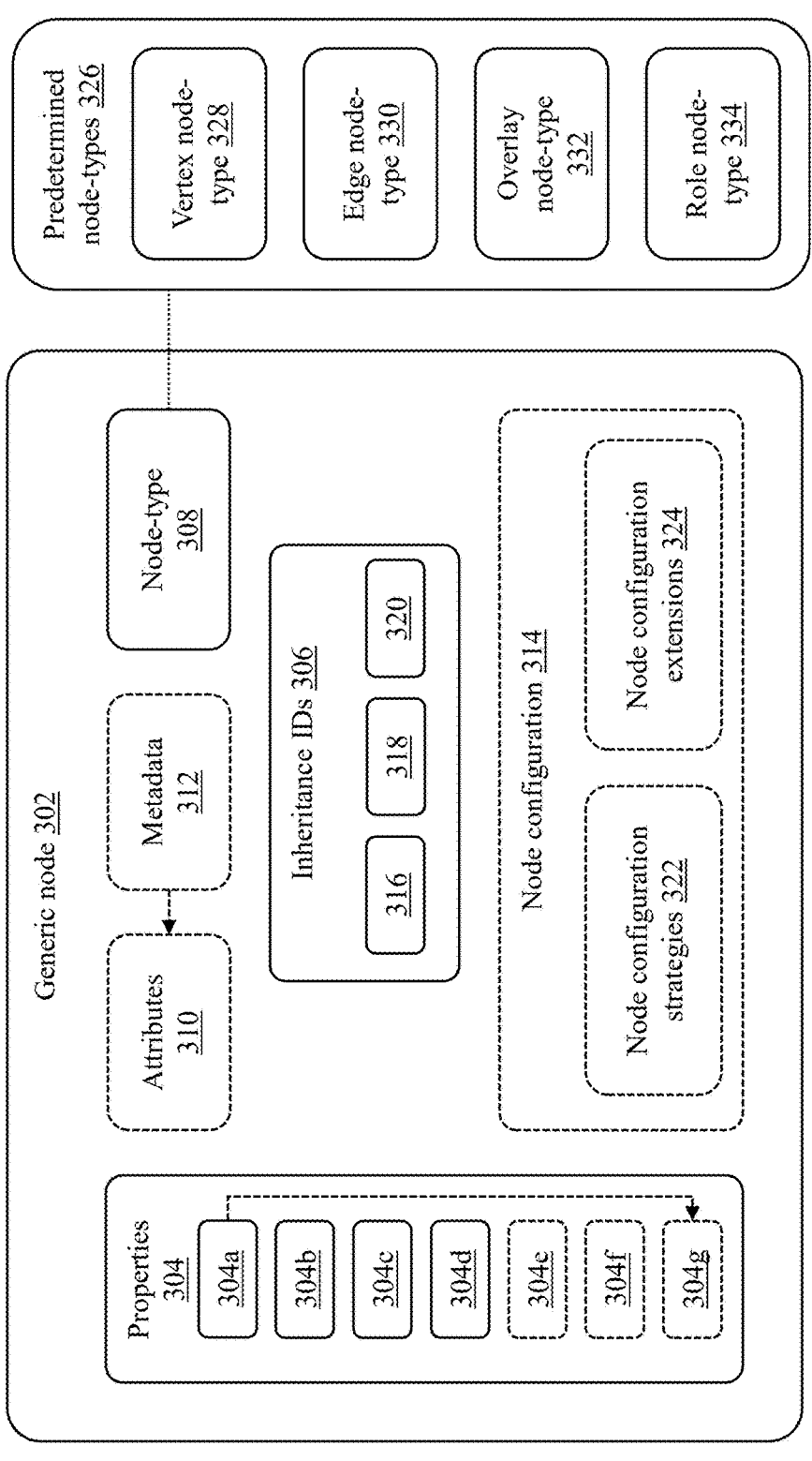
FIG. 3 is a block diagram that illustrates a standard structure of a generic node within the executable graph-based model, consistent with disclosed embodiments of the present disclosure.

FIG. 3 is a block diagram 300 that illustrates a standard structure of a generic node 302 within the executable graph-based model 100, consistent with disclosed embodiments of the present disclosure. Referring to FIG. 3, the generic node 302 corresponds to a node of the executable graph-based model 100. The generic node 302 further corresponds to the core structure of the executable graph-based model 100 and forms the foundational building block for all data and processing logic within the executable graph-based model 100. The generic node 302 includes properties 304, inheritance IDs 306, and a node-type 308. The generic node 302 optionally includes one or more attributes 310, metadata 312 associated with the attributes 310, and a node configuration 314.

The properties 304 of the generic node 302 include a unique ID 304*a*, a version ID 304*b*, a namespace 304*c*, and a name 304*d*. The properties 304 optionally include one or more icons 304*c*, one or more labels 304*f*, and one or more alternative IDs 304*g*. The inheritance IDs 306 of the generic node 302 include an abstract flag 316, a leaf flag 318, and a root flag 320. The node configuration 314 optionally includes one or more node configuration strategies 322 and one or more node configuration extensions 324.

The unique ID 304*a* is unique for each node within the executable graph-based model 100. The unique ID 304*a* is used to register, manage, and reference the generic node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the generic node 302 is incremented when the generic node 302 undergoes transactional change. This allows the historical changes between versions of the generic node 302 to be tracked by modules or overlays within the overlay system 202. The namespace 304c of the generic node 302, along with the name 304d of the generic node 302, is used to help organize nodes within the executable graph-based model 100. That is, the generic node 302 is assigned a unique name 304d within the namespace 304c such that the name 304d of the generic node 302 need not be unique within the entire executable graph-based model 100, only within the context of the namespace 304c to which the generic node 302 is assigned. The generic node 302 optionally includes one or more icons 304e which are used to provide a visual representation of the generic node 302 when visualized via a user interface. The one or more icons 304e can include icons at different resolutions and display contexts such that the visualization of the generic node 302 is adapted to different display settings and contexts. The generic node 302 also optionally includes one or more labels 304f which are used to override the name 304d when the generic node 302 is rendered or visualized.

The generic node 302 supports the concept of inheritance of data and processing logic associated with any other node of the executable graph-based model 100 that is inherited by the generic node 302. This allows the behavior and functionality of the generic node 302 to be extended or derived from the inherited node of the executable graph-based model 100. The inheritance IDs 306 of the generic node 302 indicate the inheritance-based information, which may apply to the generic node 302. The inheritance IDs 306 comprise a set of Boolean flags that identify the inheritance structure of the generic node 302. The abstract flag 316 allows the generic node 302 to support the construct of abstraction. When the abstract flag 316 takes a value 'true', the generic node 302 is flagged as abstract that is to say that it cannot be instantiated or created within an executable graph-based model (e.g., the executable graph-based model 100). Thus, in an instance when the generic node 302 has the abstract flag 316 set to 'true', the generic node 302 may only form the foundation of other nodes that inherit therefrom. By default, the abstract flag 316 of the generic node 302 is set to 'false'. The leaf flag 318 is used to indicate whether any other node may inherit from the generic node 302. If the leaf flag 318 is set to 'true', then no other node may inherit from the generic node 302 (but unlike an abstract node, a node with the leaf flag 318 set may be instantiated and created within the executable graph-based model 100). The root flag 320 is used to indicate whether the generic node 302 inherits from any other node. If the root flag 320 is set to 'true', the generic node 302 does not inherit from any other node. The generic node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node-type. The node-type 308 of the generic node 302 is used to extend the functionality of the generic node 302. All nodes within the executable graph-based model 100 comprise a node-type that defines additional data structures and implements additional executable functionality. A node-type thus includes data structures and functionality that are common across all nodes that share that node-type. Therefore, composition of a node with a node-type improves extensibility by allowing the generation of specialized node functionalities for specific application areas. Such extensibility is not present in prior art graph-based models. As illustrated in FIG. 3, the generic node 302 and the node-type 308 are one logical unit that is not separated in the context of an executing system at run-time (e.g., in the context of execution of an executable graph-based model).

FIG. 3 further shows the plurality of predetermined node-types 326 which provides a non-exhaustive list of node-types for the node-type 308 associated with the generic node 302. The plurality of predetermined node-types 326 includes a vertex node-type 328 and an edge node-type 330. The vertex node-type 328 (also referred to as a data node-type or a value node-type) includes common data structures and functionality related to the 'things' modeled in the graph (e.g., the data). The edge node-type 330 includes common data structures and functionality related to coupling/linking/associating two or more nodes. A node having the edge node-type 330 may connect two or more nodes and thus the edge node-type 330 constructs associations and connections between nodes (for example, objects or 'things') within the executable graph-based model 100. The edge node-type 330 is not restricted to the number of nodes that can be associated or connected by a node having the edge node-type 330. The data structures and functionality of the edge node-type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined node-types 326 further includes an overlay node-type 332 and a role node-type 334. As will be described in more detail below, a node with the overlay node-type 332 is used to extend the functionality of a node, such as the generic node 302, to incorporate processing logic. Unlike non-overlay nodes, an overlay node (e.g., a node having the overlay node-type 332) includes processing logic which determines the functionality of the overlay node. The processing logic of an overlay node includes a block of executable code, or instructions, which carries out one or more operations associated with the communication of data within the executable graph-based model 100. The block of executable code is pre-compiled code, code that requires interpretation at run-time, or a combination of both. Different overlay nodes provide different processing logic to realize different functionality. For example, an encryption overlay node includes an encryption technique using which an associated node is to be protected/secured and processing logic for facilitating such security/protection of the associated node.

The role node-type 334 defines a connective relationship between two nodes, for example, an edge node and a first vertex node. A node with the role node-type 334 defines a relationship without expressly defining the first vertex node to which the edge node connects. A number of roles (and thus a number of connections) that an edge node-type may have is not limited.

The one or more attributes 310 correspond to the data associated with the generic node 302 (e.g., the data represented by the generic node 302 within the executable graph-based model 100 as handled by the data management module 214). Notably, a node in the executable graph-based model 100 that is not associated with data may not have any attributes. The one or more attributes 310 represent a complex data type. Each attribute of the one or more attributes 310 is composed of an attribute behavior. Attribute behavior may be a standard attribute behavior, a reference attribute behavior, a derived attribute behavior, or a complex attribute behavior. The attribute behavior of each attribute defines the behavior of the corresponding attribute. The attribute behavior of each attribute may be configured by associated attribute configurations. The attribute configurations are examples of attribute configuration extensions which are node configuration extensions (e.g., they are part of the one or more node configuration extensions 324 of the generic node 302 shown in FIG. 3). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with the reference attribute behavior includes appropriate information to obtain a reference data set of possible values. The derived attribute behavior is a behavior that allows read-only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the generic node 302 further includes the metadata 312 (e.g., data stored as a name, a confidentiality indicator for indicating data as sensitive and/or confidential, an average processing time required for processing data, or the like) which is associated with either the generic node 302 or an attribute (for example, the one or more attributes 310) of the generic node 302. An attribute within the one or more attributes 310 may either have an independent state or a shared state. That is to say, an attribute may be a value-shared attribute or a non-value-shared attribute. An independent attribute has data that is not shared with any other node within the executable graph-based model 100. Conversely, a shared attribute has data that is shared with one or more other nodes within the executable graph-based model 100. For example, if two nodes within the executable graph-based model 100 comprise a shared-data attribute with a value state shared by both nodes, then updating the data (e.g., the value) of this shared attribute will be reflected across both nodes.

The node configuration 314 provides a high degree of configurations for the different elements of the generic node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304a of the generic node 302, which creates message source IDs. A further example of a concrete node configuration strategy 322 is a versioning strategy, associated with the configuration of the version ID 304b of the generic node 302, which supports major and minor versioning (depending on the type of transactional change incurred by the generic node 302). The versioning strategy may be adapted to a native filing system of a user device hosting the overlay system 202 or a third-party data storage (for example, Snowflake®, or the like) associated with the overlay system 202.

Figure 4:
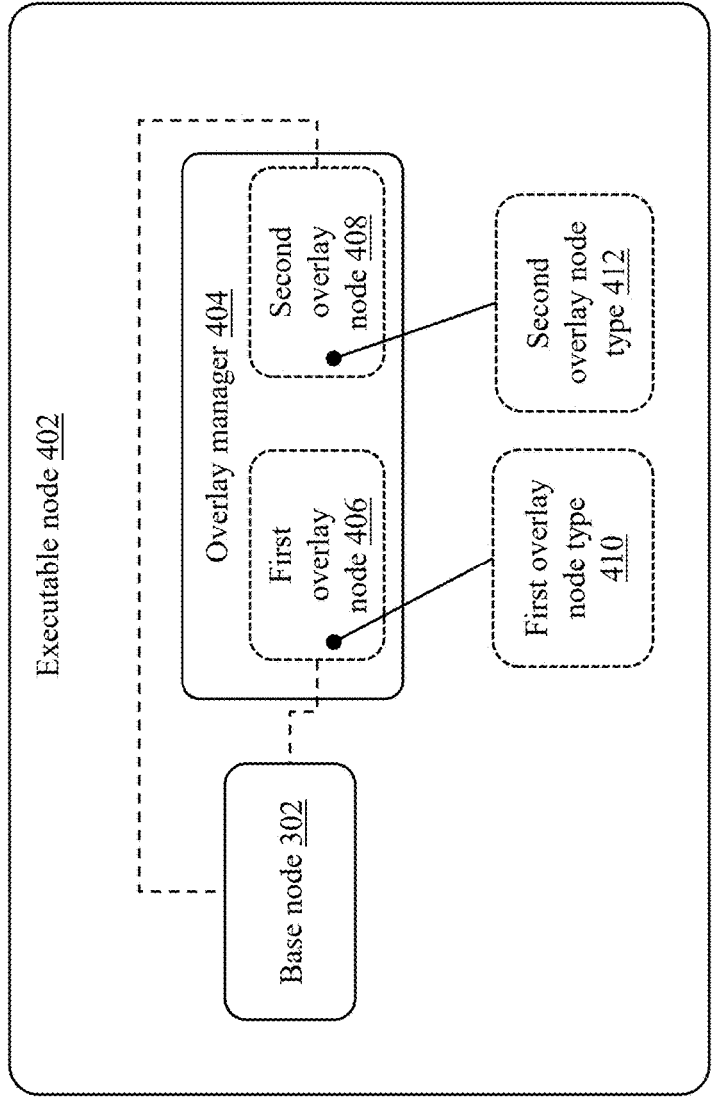
FIG. 4 is a block diagram that illustrates an executable node within the executable graph-based model, consistent with disclosed embodiments of the present disclosure.
Figure 4:

FIG. 4 is a block diagram 400 that illustrates an executable node 402 within the executable graph-based model 100, consistent with disclosed embodiments of the present disclosure. Referring to FIG. 4, the executable node 402 is shown to include a base node (e.g., the generic node 302) and an overlay manager 404. For the sake of ongoing discussion, the base node corresponds to the generic node 302, and is hereinafter referred to as the "base node 302". The base node 302 when extended by way of one or more overlay nodes becomes the executable node 402.

The overlay manager 404 includes a first overlay node 406 and a second overlay node 408. The executable node 402 provides processing functionality (e.g., processing logic) to the base node 302 via one or more associated overlay nodes (for example, the first and second overlay nodes 406 and 408). Beneficially, the data and processing capability of the base node 302 may be dynamically and significantly extended using the concept of an executable node (for example, the executable node 402). As shown, the first overlay node 406 has a first overlay node-type 410, and the second overlay node 408 has a second overlay node-type 412. Examples of overlay node-type include, but are not limited to, an encryption overlay node-type and a publisher overlay node-type.

A node with the encryption overlay node-type is an encryption overlay node that is indicative of an encryption technique using which an associated node is to be secured. The encryption overlay node also includes processing logic to secure a corresponding node. Examples of encryption techniques include a symmetric encryption algorithm, an asymmetric encryption algorithm, a combination of these, or any other encryption technique. A node with the publisher overlay node-type is a publisher overlay node that is indicative of an operation of publishing an output of an associated node. The publisher overlay node also includes processing logic to publish the output. Notably, the first overlay node 406 and the second overlay node 408 are functional overlay nodes. A functional overlay node is an overlay node that is integral to the executable graph-based model 100 and does not simulate processing logic of an external system.

Although, the executable node 402 is shown to include the first and second overlay nodes 406 and 408, in other embodiments, the executable node 402 may include any number of overlay nodes, without deviating from the scope of the present disclosure.

The executable node 402 extends the base node 302 (or is a subtype of the base node 302) such that all the functionality and properties of the base node 302 are accessible to the executable node 402. The executable node 402 also dynamically extends the functionality of the base node 302 by associating the overlay nodes maintained by the overlay manager 404 with the base node 302. The executable node 402 may thus be considered a combination of the base node 302 and the first and second overlay nodes 406 and 408. The executable node 402 may be alternatively referred to as a node with overlay(s). Therefore, the executable node 402 acts as a decorator of the base node 302 adding the functionality of the overlay manager 404 to the base node 302.

It will be apparent to a person skilled in the art that the base node 302 refers to any suitable node within the executable graph-based model 100. As such, the base node 302 may be a node having a node-type such as a vertex node-type, an edge node-type, an overlay node-type, a role node-type, or the like. Alternatively, the base node 302 may be an executable node such that the functionality of the (executable) base node 302 is dynamically extended. In this way, complex and powerful processing functionality can be dynamically generated by associating and extending overlay nodes.

The overlay manager 404 registers and maintains one or more overlay nodes (such as the first overlay node 406 and the second overlay node 408) associated with the base node 302. The assignment of the first and second overlay nodes 406 and 408 to the base node 302 (via the overlay manager 404) endows the base node 302 with processing logic and executable functionality defined within the first and second overlay nodes 406 and 408.

Extending the functionality of a base node through one or more overlay nodes is at the heart of the overlay system 202. As illustrated in FIG. 2, the data (e.g., a vertex node as represented by the base node 302 in FIG. 4) and the functionality that acts upon that data (e.g., an overlay node) can be separated and independently maintained offline, but at run-time, an association between the data node and the overlay node is determined and an executable node is generated (e.g., the executable node 402 shown in FIG. 4).

It will be apparent to a person skilled in the art that functionalities of the first and second overlay nodes 406 and 408 may be performed by a single overlay node that includes processing logic associated with both of the first and second overlay nodes 406 and 408.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node-type of the node to which the overlay node is applied.

An overlay node, such as the first overlay node 406 or the second overlay node 408, is not bound to a single executable node or a single executable graph-based model (unlike nodes that have non-overlay node-types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 404 of the executable node 402 is responsible for executing all overlays registered therewith. The overlay manager 404 also coordinates the execution of all associated overlay nodes. As shown in FIG. 4, the executable node 402 associates the base node 302 with two overlay nodes, that is the first overlay node 406 and the second overlay node 408. Thus, the overlay manager 404 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 404 and are associated with an overlay via a node configuration extension for the overlay.

To summarize, a node associated with an overlay node is referred to as an executable node. The node and the overlay node associated therewith may persist within the overlay system 202. The persistent nature of the data and the processing logic associated with an executable node and an associated overlay node (e.g., generic overlay and signal overlay) are described in detail in conjunction with FIG. 5.

For the sake of brevity, the first and second overlay nodes 406 and 408 shown herein are assumed to be functional overlay nodes. In some embodiments, the first and second overlay nodes 406 and 408 may be simulated overlay nodes that may be simulating processing logic of an external system. In such embodiments, the overlay manager 404 may manage the first and second overlay nodes 406 and 408 as described in conjunction with FIG. 4 without deviating from the scope of the disclosure.

Throughout the description, an executable node is represented by way of two concentric circles. In other words, the executable node is represented by way of an inner circle encircled by an outer circle, where the incircle represents a base node and the outer circle represents an overlay node associated with the base node. Throughout the description, the term 'node' may be used to, collectively, refer to a simulated node and a generic node.

Figure 5:
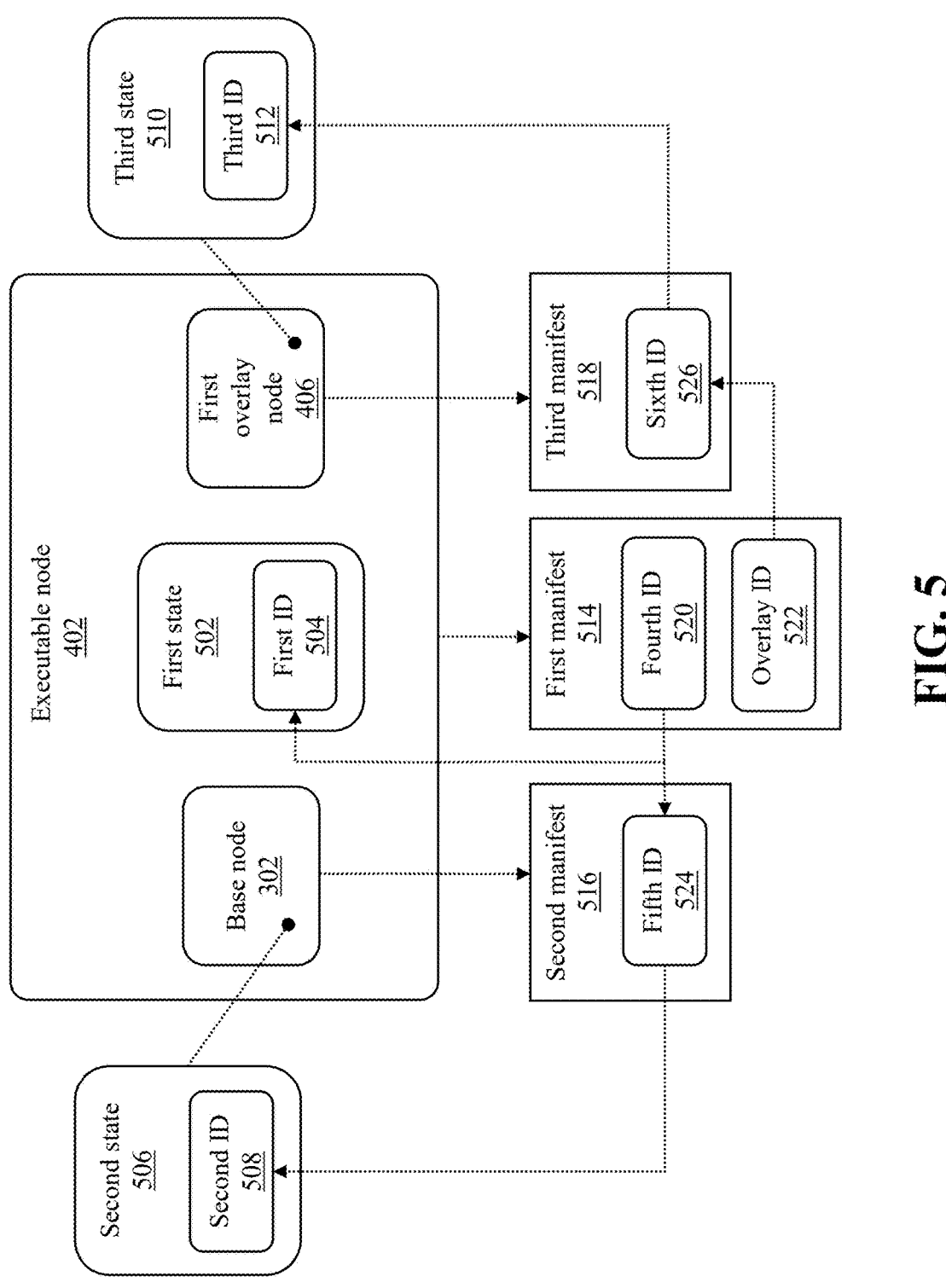
FIG. 5 is a block diagram that illustrates a composition of the executable node that enables persistent storage of data and processing logic associated therewith, consistent with disclosed embodiments of the present disclosure.

FIG. 5 is a block diagram 500 that illustrates a composition of the executable node 402 that enables persistent storage of data and the processing logic associated therewith, consistent with disclosed embodiments of the present disclosure.

As described in conjunction with FIG. 4, the executable node 402 includes the base node 302 and one or more overlay nodes (e.g., the first and second overlay nodes 406 and 408). For the brevity of the ongoing description, the persistent storage is explained for the executable node 402 including only the first overlay node 406. One or more operations performed for ensuring the persistence of the first overlay node 406 may be performed for the second overlay node 408 as well.

Referring to FIG. 5, the executable node 402 includes the base node 302 and the first overlay node 406. The executable node 402 has a corresponding first state 502 having a first ID 504. The base node 302 has a second state 506 having a second ID 508, and the first overlay node 406 has a third state 510 having a third ID 512. A manifest (for example, first through third manifests 514-518) is generated for each of the base node 302, the executable node 402, and the first overlay node 406. In an embodiment, the manifests may be generated by the storage management module 220. The first manifest 514 is associated with the executable node 402 and has a fourth ID 520 and an overlay ID 522. The second manifest 516 is associated with the base node 302 and has a fifth ID 524. The third manifest 518 is associated with the first overlay node 406 and has a sixth ID 526. Further, the manifests are stored at respective storage locations that may be centralized or distributed storage locations associated with the overlay system 202. The manifests may be stored by the storage management module 220.

The first state 502 of the executable node 402 includes data required to reconstruct the executable node 402 (e.g., attributes, properties, etc.). The first state 502 of the executable node 402 is persistently stored along with the first ID 504. The first manifest 514 is generated for the executable node 402 and has (i) the fourth ID 520 (which is the same as the first ID 504), (ii) the storage location of the first state 502 of the executable node 402, and (iii) the overlay ID 522 (which is the same as the sixth ID 526). Notably, the fourth ID 520 is the same as the first ID 504 and the fifth ID 524, hence, the first manifest 514 includes the ID of the state of the base node 302 and the executable node 402. Further, the overlay ID 522 is the same as the sixth ID 526 of the state of the first overlay node 406. Therefore, the first manifest 514 may be used to identify and retrieve the states of the base node 302, the executable node 402, and the first overlay node 406. Subsequently, the retrieved states may be used to reconstruct the executable node 402 and the first overlay node 406. In an instance, the executable node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the base node 302 includes data required to reconstruct the base node 302 (e.g., attributes, properties, etc.) and is persistently stored along with the second ID 508. The second manifest 516 is generated for the base node 302 and has the fifth ID 524 and the storage location of the second state 506 of the base node 302. The second ID 508 of the second state 506 and the fifth ID 524 of the second manifest 516 are the same as the first ID 504 of the first state 502 of the executable node 402 (which is also the same as the fourth ID 520 of the first manifest 514 of the executable node 402). As mentioned above, along with the first state 502, the first manifest 514 may also be used to identify and retrieve the second manifest 516 which in turn may be used to identify the second state 506 of the base node 302. A second manifest state (not shown) is then generated for the second manifest 516 and persistently stored along with the fifth ID 524. Thus, the states, manifests, and manifest states for the executable node 402 and the base node 302 include the same, shared, ID. A shared ID can be used in this instance because the states, manifests, and manifest states are stored separately. The separate storage of the states, manifests, and manifest states exhibit a distributed architecture of the overlay system 202.

The third state 510 of the first overlay node 406 includes data required to reconstruct the first overlay node 406 (e.g., attributes, properties, processing logic, etc.) and is persistently stored along with the third ID 512. The third manifest 518 is generated for the first overlay node 406 and includes the sixth ID 526, which is the same as the third ID 512. Therefore, the first manifest 514 may be further used to identify and retrieve the third manifest 518 which in turn may be used to identify and retrieve the third state 510 of the first overlay node 406. A third manifest state (not shown) is then generated for the third manifest 518 and is persistently stored along with the sixth ID 526.

In operation, when the executable node 402 is to be loaded, the transaction module 208, in conjunction with the storage management module 220, may execute one or more operations to retrieve the first manifest state stored at a known storage location. Based on the first manifest state, the storage management module 220 may re-construct the first manifest 514 which includes the fourth ID 520 which is the same as the fifth ID 524 of the second manifest 516. Based on the fifth ID 524, the storage management module 220 may identify the second manifest state and may generate the second manifest 516 based on which the second state 506 is identified. Subsequently, the base node 302 is loaded and the storage management module 220 may determine that the base node is a node with overlay. Based on the fourth ID 520 (that is the same as the first ID 504 of the first state 502 of the executable node 402) of the first manifest 514, the first state 502 is identified and retrieved. Subsequently, the executable node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the first overlay node 406 is reconstructed and loaded in the executable graph-based model 100.

Based on a context of a stimulus (for example, the stimulus 230) associated with the overlay system 202, the processing circuitry (such as the context module 210) may determine an ID which is the same as the fifth ID 524. Based on the determined ID, the processing circuitry (such as the memory management module 218 and the storage management module 220) may identify the second manifest 516. Subsequently, the processing circuitry (such as the memory management module 218 and the storage management module 220) may identify the second state 506 that has the second ID 508 that matches the fifth ID 524. Further, the processing circuitry (such as the memory management module 218 and the storage management module 220) may retrieve the second state 506 associated with the second manifest 516 from a corresponding storage element. Subsequently, the processing circuitry (such as the memory management module 218 and the storage management module 220) may determine, by checking the manifest storage(s) associated with the overlay system 202, whether there is another manifest (such as the first manifest of the executable node 402) with an ID that matches the second ID 508 and the fifth ID 524. Notably, the first manifest 514 includes storage locations of each overlay node (for example, the first overlay node 406) of the executable node 402. Based on the overlay ID 522 included in the first manifest 514 that matches the sixth ID 526 included in the third manifest 518, the processing circuitry (such as the memory management module 218 and the storage management module 220) may identify and retrieve the third manifest 518 from a manifest storage of a plurality of manifest storages of the overlay system 202. Subsequently, the processing circuitry (such as the memory management module 218 and the storage management module 220) may identify the third state 510 which has the third ID 512 that matches the sixth ID 526. Further, the processing circuitry (such as the memory management module 218 and the storage management module 220) may retrieve the third state 510 associated with the third manifest 518 from a corresponding storage element. To determine whether the first overlay node 406 has an overlay node associated therewith, the processing circuitry (such as the memory management module 218 and the storage management module 220) may also perform a check to determine whether any of the plurality of manifest storages of the overlay system 202 includes any other manifest with an ID that matches the sixth ID 526. Since the first overlay node 406 does not have an overlay associated therewith, no other manifest has the ID that matches the sixth ID.

Notably, the manifest (the third manifest 518) of the first overlay node 406 includes a reference (such as an identifier that is common to the second manifest 516 and the third manifest 518, a link, a path, a storage location, or the like) to the second manifest 516 of the base node 302. Therefore, the re-formation of the executable node 402 includes re-creation of the first overlay node 406 prior to re-creation of the base node 302. Subsequently, the first overlay node 406 and the base node 302 are organized by associating the base node 302 with the first overlay node 406 to re-form the executable node 402.

In some embodiments, the first overlay node 406 may not be loaded in case it is not required for executing the operation associated with the stimulus 230. The loaded executable node 402 and the first overlay node 406 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time (for example, idle time-interval threshold). Further, the data and the processing logic associated with the executable node/overlay node are transferred to an external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, the management and storage of manifests is managed by the controller module 206, the memory management module 218, the storage management module 220, a combination of these, or any other module of the overlay system 202. Also, all manifest states are stored together at a storage location (such as a manifest storage) that is known to the storage management module 220. Such centralized storage of the manifest states ensures that node states associated therewith are easily accessible.

It will be apparent to a person skilled in the art that although FIG. 5 illustrates only a single overlay node (for example, a simulated overlay node and a functional overlay node) associated with a node, in other embodiments, the executable node 402 may include additional or different overlay nodes (for example, the second overlay node 408). It will also be apparent to a person skilled in the art that only those overlay nodes that are required for responding to the stimulus 230 may be loaded.

The overlay system 202 described in conjunction with FIGS. 1-5 is used to facilitate one or more operations associated with the implementation of an external system in the executable graph-based model 100. Various concepts and features associated with the generation of simulated nodes for simulating objects of the external system in the overlay system 202 are described in detail later in the description.

Figure 6:
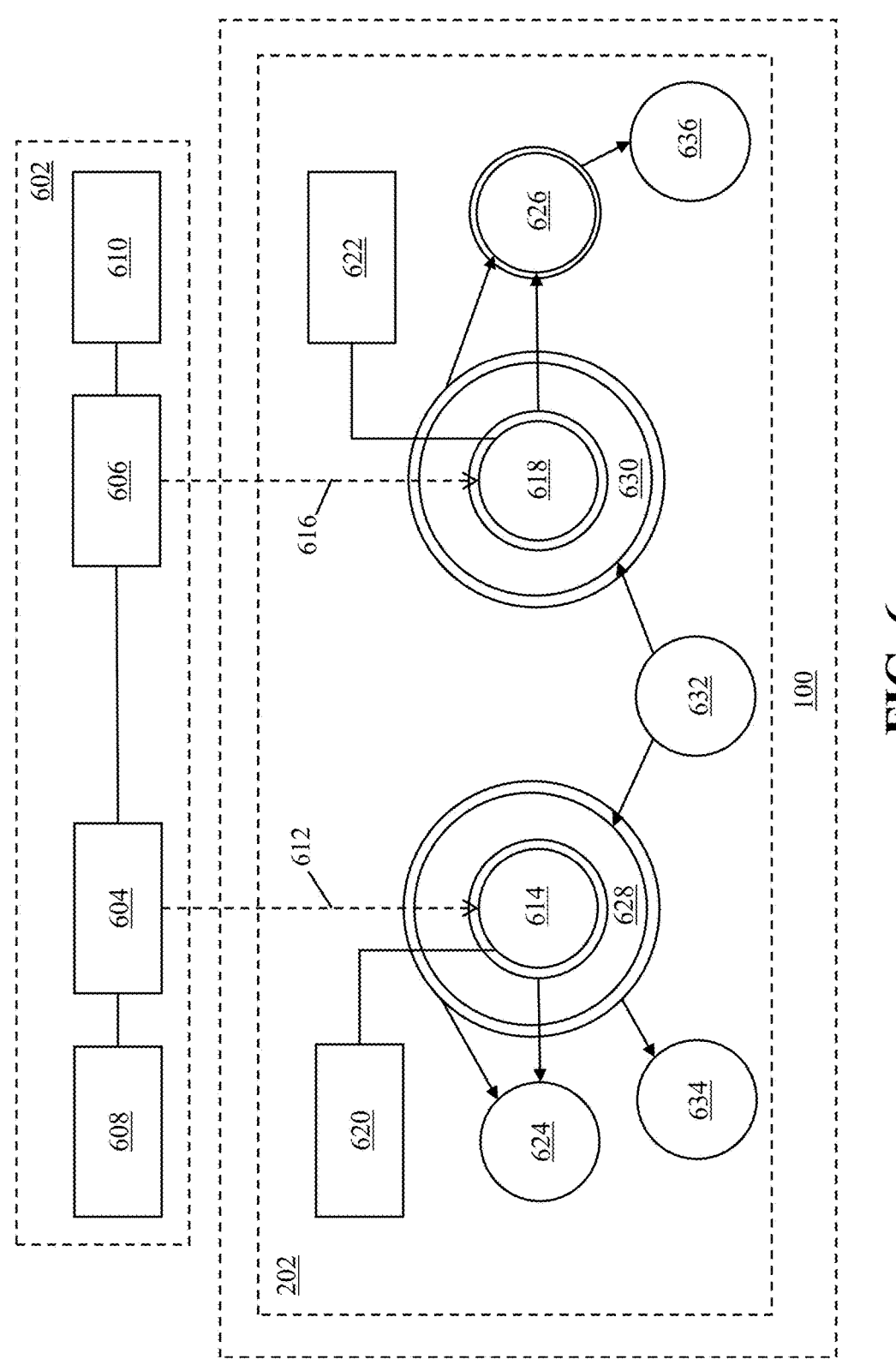
FIG. 6 is a block diagram that depicts simulation of objects of an external system in the executable graph-based model, consistent with disclosed embodiments of the present disclosure.

FIG. 6 is a block diagram 600 that depicts simulation of objects of an external system in the executable graph-based model 100, consistent with disclosed embodiments of the present disclosure. Referring to FIG. 6, shown is the overlay system 202 including the executable graph-based model 100. FIG. 6 further depicts an external system 602 that is to be implemented by way of the executable graph-based model 100. The external system 602 may include a plurality of objects including objects 604 and 606 with associated object datasets 608 and 610, respectively. An object may be an entity, data, processing logic, a property of an entity, a record of an entity, an attribute of an entity, a group of entities, a group of records of an entity, a group of properties of an entity, a group of attributes of an entity, or the like. The object may be associated with an object dataset that includes data, information, metadata, or the like associated with the object in form of text, numeric, alphanumeric, symbol, audio, video, or any other form of data representation.

For implementing the external system 602 by way of the overlay system 202, each object (for example, the objects 604 and 606) of the external system 602 may have to be simulated in the executable graph-based model 100. The phrase 'simulating an object in the executable graph-based model 100' refers to an event of creating an interface for the object within the executable graph-based model 100 such that the object seems to be an original and integral part of the executable graph-based model 100.

In operation, the processing circuitry (for example, the stimuli management module 212) may receive a first stimulus (for example, the stimulus 230) to implement the external system 602 by way of the overlay system 202. In other words, the processing circuitry (for example, the stimuli management module 212) may receive the first stimulus (for example, the stimulus 230) to simulate a plurality of objects of the external system 602 in the overlay system 202. Based on the first stimulus, the processing circuitry (for example, the controller module 206 and the simulation management module 216) may determine a simulation strategy and a count of objects of the external system 602 that may have to be simulated for implementing the external system 602 by way of the overlay system 202. The simulation strategy may refer to an approach for implementing the external system 602 by way of the overlay system 202. The simulation strategy may be a one-to-one simulation, one-to-may simulation, or many-to-one simulation.

The one-to-one simulation may refer to a simulation strategy that allows each object (for example, the objects 604 and 606) of the external system 602 to be simulated in the overlay system 202 by a corresponding simulated node. In other words, the one-to-one simulation allows each object of the external system 602 to be represented by a corresponding simulated node in the overlay system 202.

The one-to-many simulation may refer to a simulation strategy that allows an object (for example, the objects 604 and 606) of the external system 602 to be simulated in the overlay system 202 by a set of simulated nodes. In other words, the one-to-many simulation allows the object of the external system 602 to be represented by the set of simulated nodes in the overlay system 202 such that each simulated node of the set of simulated nodes represents a unit of data associated with the object.

The many-to-one simulation may refer to a simulation strategy that allows a set of objects (for example, the objects 604 and 606) of the plurality of objects of the external system 602 to be simulated in the overlay system 202 by a single simulated node. In other words, the one-to-many simulation allows the set of objects of the external system 602 to be represented/interfaced by a single simulated node in the overlay system 202.

For the sake of brevity, it is assumed that the external system 602 is implemented by way of the overlay system 202 using the one-to-one simulation. In some embodiments, the external system 602 may be implemented by way of the overlay system 202 using the one-to-many simulation, many-to-one simulation, or any other simulation strategy applicable to interface objects of the external system 602 in the overlay system 202. In addition, it is assumed that the first stimulus may be indicative of each of the plurality of objects to be simulated in the overlay system 202. In some embodiments, the first stimulus may be indicative of one or more objects of the plurality of objects to be simulated in the overlay system 202.

The determined count of objects may be indicative of each of the plurality of objects to be simulated in the overlay system 202. Based on the determined count of objects, the processing circuitry (for example, the controller module 206 and the simulation management module 216) may be configured to instantiate a preliminary node, in the executable graph-based model 100, to interface each object (for example, the objects 604 and 606) of the external system 602 in the overlay system 202. A preliminary node may be a unit of the executable graph-based model 100 which may have a node structure as described in conjunction with FIG. 3 but not a node-type. As shown by a dotted arrow 612, the processing circuitry may create a preliminary node 614 for the object 604. Similarly, as shown by a dotted arrow 616 the processing circuitry may create a preliminary node 618 for the object 606.

Based on the first stimulus (for example, the determined count of objects), the processing circuitry (for example, the controller module 206 and the simulation management module 216) may be configured to acquire the object datasets 608 and 610 associated with the objects 604 and 606, respectively, from the external system 602. In some embodiments, the processing circuitry (for example, the controller module 206 and the simulation management module 216) may acquire the object datasets 608 and 610 by executing a PULL operation. In other embodiments, the processing circuitry (for example, the stimuli management module 212) may receive the object datasets 608 and 616 along with the first stimulus. For example, the object datasets 608 and 610 may be included in a command/instruction associated with the first stimulus.

The processing circuitry (for example, the controller module 206 and the simulation management module 216) may be configured to determine a data organization schema associated with the external system 602. The data organization schema may refer to a first set of constraints/rules in accordance with which the object datasets 608 and 610 associated with the objects 604 and 606 may be organized/implemented in the external system 602. In some embodiments, the processing circuitry (for example, the stimuli management module 212) may receive the data organization schema associated with the external system 602 along with the first stimulus. In some embodiments, the processing circuitry (for example, the stimuli management module 212) may determine the data organization schema associated with the external system 602 by executing a PULL operation. In some embodiments, the processing circuitry (for example, the stimuli management module 212) may determine the data organization schema associated with the external system 602 based on the object datasets 608 and 610.

Subsequently, the processing circuitry (for example, the controller module 206 and the simulation management module 216) may be configured to generate a first data template based on the data organization schema associated with the external system 602. The first data template may include a set of data organization rules that interpret the first set of constraints/rules of the data organization schema of the external system 602 to the overlay system 202. Subsequently, the processing circuitry (for example, the controller module 206 and the simulation management module 216) may be configured to generate a second data template based on a schema associated with the overlay system 202. The schema associated with the overlay system 202 may be a blueprint of a data organization architecture of the overlay system 202. The second data template may include a second set of constraints/rules according to which data/information may be organized within the overlay system 202. Subsequently, the processing circuitry (for example, the controller module 206 and the simulation management module 216) may be further configured to map the first data template with the second data template. The mapping of the first data template with the second data template may be performed to determine a set of similarities and a set of differences in the data organization schema associated with the external system 602 and the schema of the overlay system 202. Based on the determined set of differences, the processing circuitry (for example, the controller module 206 and the simulation management module 216) may determine a set of additional constraints according to which the object datasets 608 and 610 may be organized within the overlay system 202 such that it replicates the data organization schema of the external system 602 while adhering to the schema of the overlay system 202.

Subsequently, based on the object dataset 608, the processing circuitry (for example, the controller module 206 and the simulation management module 216) may be configured to generate a first set of attribute values associated with the object 604. Similarly, based on the object dataset 610, the processing circuitry (for example, the controller module 206 and the simulation management module 216) may be configured to generate a first set of attribute values associated with the object 606. In some embodiments, the first sets of attribute values for the objects 604 and 606 may be generated based on the mapping of the first and second data templates. In other words, the first sets of attribute values for the objects 604 and 606 may be generated based on the set of similarities between the first and second data templates and the set of addition constraints that have been determined based on the mapping of the first and second data templates.

In some embodiments, the first sets of attribute values may be generated based on the second data template. That is to say that the first sets of attribute values may be generated based on the schema of the overlay system 202. Notably, the generation of the first sets of attribute values based on the mapping of the first and second data templates and/or the schema of the overlay system 202 ensures that the object datasets 608 and 610 are organized within the overlay system 202 such that it reflects the schema of the overlay system 202 without being incompatible with the data organization schema of the external system 602.

In some embodiments, the processing circuitry (for example, the controller module 206 and the simulation management module 216) may be further configured to generate a second set of attribute values for each of the objects 604 and 606. The second set of attribute values may be generated in conformity with the schema of the overlay system 202. The second set of attribute values may be generated based on a set of data organization constraints associated with the schema of the overlay system 202. In an example, the schema may support one or more labels and metadata. However, the first and second object datasets 608 and 610 may not include any label or metadata associated with the objects 604 and 606, respectively. In such an example, the processing circuitry (for example, the controller module 206 and the simulation management module 216) may generate the second set of attribute values including the one or more labels and metadata for the objects 604 and 606.

The processing circuitry (for example, the controller module 206 and the simulation management module 216) may be further configured to map the first set of attribute values and the second set of attribute values associated with the object 604 to a first set of attributes and a second set of attributes, respectively, of the preliminary node 614. The first set of attributes and the second set of attributes, collectively, constitute the preliminary node 614. The first set of attributes and the second set of attributes associated with the preliminary node 614 are depicted, collectively, as a set of attributes 620. Similarly, the processing circuitry (for example, the controller module 206 and the simulation management module 216) may be further configured to map the first set of attribute values and the second set of attribute values associated with object 606 to a first set of attributes and a second set of attributes, respectively, of the preliminary node 618. The first set of attributes and the second set of attributes, collectively, constitute the preliminary node 618. The first set of attributes and the second set of attributes associated with the preliminary node 618 are depicted, collectively, as a set of attributes 622.

As mentioned previously, the preliminary nodes 614 and 618 may not have an associated node-type. Notably, a preliminary node without a node-type may not be able to act as an integral part of the executable graph-based model 100. Therefore, the processing circuitry (for example, the controller module 206 and the simulation management module 216) may associate the preliminary nodes 614 and 618 with simulation overlay nodes 624 and 626, respectively. Based on the association with the simulation overlay nodes 624 and 626, the processing circuitry (for example, the controller module 206 and the simulation management module 216) may customize the node structure of the preliminary nodes 614 and 618, respectively. The processing circuitry (for example, the controller module 206 and the simulation management module 216) may determine the node-types of the preliminary nodes 614 and 618 based on the customization of the node structures thereof. To customize the node structure of the preliminary nodes 614 and 618, the processing circuitry (for example, the controller module 206 and the simulation management module 216) may be configured to modify a node structure of the preliminary nodes 614 and 618. The node structures of the preliminary nodes 614 and 618 may be modified based on node-types of the simulation overlay nodes 624 and 626, respectively.

Subsequently, the processing circuitry (for example, the controller module 206 and the simulation management module 216) may generate simulated nodes 628 and 630, in the executable graph-based model 100, for the preliminary nodes 614 and 618 such that the simulated nodes 628 and 630 simulate the objects 604 and 606, respectively, in the executable graph-based model 100. Notably, based on the customization of the node structures of the preliminary node 614 and 618, node structures of the simulated nodes resemble the node structure of the generic node 302 depicted in FIG. 3. As mentioned previously, the first set of attributes and the second set of attributes, collectively, constitute the preliminary node 614. Therefore, the first set of attributes and the second set of attributes of the preliminary node 614, collectively, constitute the simulated node 628. Similarly, the first set of attributes and the second set of attributes of the preliminary node 618, collectively, constitute the simulated node 630. Thus, the object 604 may be simulated in the overlay system 202 by way of the preliminary node 614 and the simulation overlay node 624. Based on the association of the simulation overlay node 624 with the preliminary node 614, the simulation overlay node 624 may be further associated with the simulated node 628. The preliminary node 614 and the simulation overlay node 624 logically form the simulated node 628. Therefore, the simulated node 628 simulates the object 604 in the executable graph-based model 100. Similarly, the object 606 may be simulated in the overlay system 202 by way of the preliminary node 618 and the simulation overlay node 626. Based on the association of the simulation overlay node 626 with the preliminary node 618, the simulation overlay node 626 may be further associated with the simulated node 630. The preliminary node 618 and the simulation overlay node 626 logically form the simulated node 630. Therefore, the simulated node 630 simulates the object 606 in the executable graph-based model 100.

Based on the simulation of the plurality of objects of the external system 602 in the overlay system 202, the external system 602 may get implemented by way of the overlay system 202.

In some embodiments, the object 604 may be associated with the object 606. The association between the objects 604 and 606 may be based on an association between the object datasets 608 and 610. In an example, the object 604 may represent a 'manager' and the object 606 may represent an 'associate' of the 'manager' such that the 'manager' and the 'associate' may be working on a software development project. The object dataset 608 may represent that the 'manager' represented by the object 604 is a project head of the software development project. Additionally, the object dataset 610 may represent that the 'associate' represented by the object 606 is a developer of the software development project. Therefore, based on association with the software development project, the object datasets 608 and 610 may be associated. Consequently, the objects 604 and 606 may be associated.

Based on the association between the objects 604 and 606, the processing circuitry (for example, the controller module 206 and the simulation management module 216) may determine an association between the simulated nodes 628 and 630. The processing circuitry (for example, the controller module 206 and the simulation management module 216) may associate the simulated nodes 628 and 630 based on the association between the objects 604 and 606. In other words, the processing circuitry (for example, the controller module 206 and the simulation management module 216) may associate the simulated nodes 628 and 630 based on the association between the object datasets 608 and 610.

In some embodiments, the association between the objects 604 and 606 may be based on the object 604 inheriting data and/or processing logic from the object 606. Based on such association the simulated node 628 may inherit from the simulated node 630. The simulated node 628 may inherit overlay nodes and any other node owned, used, or shared by the simulated node 630. The simulated node 628 may also inherit associations of the simulated node 630.

In some embodiments, the association between the objects 604 and 606 may be based on the object 604 being dependent on the object 606. Based on such association the simulated node 628 may be dependent on the simulated node 630. Therefore, the simulated node 630 may be required to execute one or more operations using the simulated node 628.

In some embodiments, the simulated node 628 may be associated with a set of generic nodes. The association may be based on the simulated node 628 inheriting from the set of generic nodes. Alternatively, the association may be based on the simulated node 628 being dependent on the set of generic nodes. Notably, a node that is not a simulated node or a simulation overlay node may be a generic node. It will be apparent to a person skilled in the art that concepts regarding association of two or more simulated nodes may also be applicable to associations between a simulated node and the set of generic nodes.

In some embodiments, the simulated node 628 may be loaded based on the stimulus. Further, based on the loading of the simulated node 628, the processing circuitry (for example, the memory management model 218 and the storage management module 220) may be configured the load a set of simulated nodes and/or a set of generic nodes associated with the simulated node 628. Subsequently, the operation associated with the stimulus may be executed based on the simulated node 628 along with the set of simulated nodes and/or the set of generic nodes.

In some embodiments, upon execution of the operation associated with the stimulus, the simulated node 628 may be unloaded from the executable graph-based model 100. Additionally, the set of simulated nodes and/or the set of generic nodes associated with the simulated node 628 may also be unloaded.

In some embodiments, the processing circuitry (for example, the controller module 206 and the simulation management module 216) may associate the simulated nodes 628 and 630 by way of a simulated edge node representing the software development project. In such embodiments, the simulated edge node may simulate an association between the objects 604 and 606 in the external system 602.

In some embodiments, the processing circuitry (for example, the controller module 206 and the simulation management module 216) may associate the preliminary nodes 614 and 618 by way of an edge node (not shown). In such embodiments, the edge node may be indicative of an interpretation of an association between the objects 604 and 606 in the external system 602 and may not simulate a direct association between the objects 604 and 606. The edge node may include roles for the preliminary nodes 614 and 618. In some embodiments, the edge node may be logically customized to form another edge node (for example, an edge node 632) that may associate the simulated nodes 628 and 630 with each other. The edge node 632 may include roles for the simulated nodes 628 and 630.

The executable graph-based model 100 may further include a plurality of function overlay nodes. A function overlay node may be same as the generic node 302 with the overlay node-type 332. Each function overlay node may include processing logic that when executed on an associated simulated node may perform one or more operations on an object interfaced by the simulated node. A simulated node may be associated with one or more function overlay nodes. As shown, the simulated node 628 is associated with a function overlay node 634. Notably, the simulated node 628 may include a first overlay manager (not shown) which may have a description similar to the description of the overlay manager 404 depicted in FIG. 4. The first overlay manager may manage the association of the simulated node 628 with the simulation overlay node 624 and the function overlay node 634.

In some embodiments, the simulated node 628 may be associated with one or more simulated overlay nodes (not shown) that may represent a function associated with the external system 602. The first overlay manager may manage the association of the simulated node 628 with the one or more simulated overlay nodes.

In some embodiments, the simulation overlay node 626 may be associated with one or more function overlay nodes (for example, a function overlay node 636). In such an embodiment, the simulation overlay node 626 may include a second overlay manager (not shown) which may have a description similar to the description of the overlay manager 404 depicted in FIG. 4. The second overlay manager may manage the association of the simulation overlay node 626 with the function overlay node 636.

In some embodiments, the simulation overlay node 626 may be associated with one or more simulated overlay nodes (not shown). The one or more simulated overlay nodes may represent functions associated with the external system 602. In such an embodiment, the simulation overlay node 626 may include a second overlay manager (not shown) which may have a description similar to the description of the overlay manager 404 depicted in FIG. 4. The second overlay manager may manage the association of the simulation overlay node 626 with the one or more simulated overlay nodes.

In some embodiments, the processing circuitry (for example, the stimuli management module 212) may receive a second stimulus (for example, the stimulus 230) indicative of an operation associated with the object 604. An execution of the operation may be based on the object dataset 608. In other words, the operation may be associated with the first set of attribute values of the simulated node 628. Notably, the first set of attribute values of the simulated node 628 is same as the first set of attribute values mapped to the first set of attributes of the preliminary node 614. Based on the second stimulus, the processing circuitry (for example, the controller module 206, the transaction module 208, or the like) may identify the simulated node 628 that may be simulating the object 604 in the executable graph-based model 100. The processing circuitry (for example, the controller module 206, the transaction module 208, or the like) may identify the simulated node 628 based on mapping of the first set of attribute values to the first set of attributes of the preliminary node 614. Based on the identification of the simulated node 628, the processing circuitry (for example, the controller module 206, the transaction module 208, or the like) may determine whether the simulated node 628 and one or more other nodes (for example, simulated nodes, generic nodes, function overlay nodes) required for processing the second stimulus are loaded in the executable graph-based model 100. Based on the simulated node 628 and the one or more other nodes being not loaded in the executable graph-based model 100, the processing circuitry (for example, the memory management module 218 and the storage management module 220) may load the simulated node 628 and the one or more other nodes in the executable graph-based model 100. The loading of the simulated node 628 and the one or more other nodes may be performed as described in conjunction with FIG. 5.

Subsequently, the processing circuitry (for example, the controller module 206, the transaction module 208, or the like) may execute the operation associated with the second stimulus using the first set of attributes of the simulated node 628 and the one or more other nodes.

In some embodiments, the simulated node 628 may be mutable. In such embodiments, the operation associated with the second stimulus may be executed on an original version of the simulated node 628. In some embodiments, the simulated node 628 may be immutable. In such embodiments, the operation associated with the second stimulus may be executed on a mutable version of the simulated node 628.

In some embodiments, the simulation of the objects 604 and 606 may be rolled back. In such embodiments, the simulated nodes 628 and 630 may be removed/deleted from the executable graph-based model 100. The objects 604 and 606 may be updated in the external system 602 based on a current state of the simulated nodes 628 and 630 at the time of resolution thereof. In an instance of a rollback event, based on the simulated node 628 being a mutable node, the object 604 may be updated to reflect the current state of the simulated node 628. In another instance of the rollback event, based on the simulated node 628 being an immutable node, the object 604 may remain in its original state in which its simulation in the overlay system 202 may have been initiated. Alternatively, the object 604 may be updated to reflect a state of a mutable version of the simulated node 628.

In some embodiments, a simulated node (for example, the simulated node 628) may be a stateful node. A stateful node is persistent within the overlay system 202. Data and/or processing logic associated with such a node is stored in the storage device associated with the overlay system 202. A stateful node may be loaded and used at any point in time based on its requirement.

In some embodiments, a simulated node (for example, the simulated node 628) may be a stateless node. A stateless node is non-persistent in nature and hence is not stored in the storage device associated with the overlay system 202. Therefore, an object simulated by a simulated node that is a stateless node may have to be simulated again once the corresponding simulated node gets unloaded from the executable graph-based model 100.

In some embodiments, the simulated node 628 may be unloaded from the executable graph-based model 100 based on an expiration of an idle time-interval threshold associated with the simulated node 628. The idle time-interval threshold may refer to a maximum time period for which the simulated node 628 may remain loaded in the executable graph-based model 100 while remaining unutilized. That is to say that, upon being loaded, the simulated node 628 may remain loaded in the executable graph-based model 100 until the idle time-interval threshold associated therewith expires. Upon expiration of the idle time-interval threshold, in case the simulated node 628 remains unutilized, it may get unloaded from the executable graph-based model 100.

In some embodiments, an idle time-interval threshold of each of a plurality of simulated nodes in the executable graph-based model 100 may be same. In other embodiments, the idle time-interval threshold for each of the plurality of simulated nodes may be specific to the simulated node. For a given simulated node, a corresponding idle time-interval threshold may be determined based on a requirement of the simulated node to remain loaded for execution of one or more operations associated therewith.

In some embodiments, the processing circuitry may be configured to modify a simulated node. Such modification may be based on a change in the data organization schema associated with the external system 602. Alternatively, such modification may be performed based on a stimulus indicative of such an operation. The simulated node may be modified by including a preliminary node, interfacing an object of the external system, in the simulated node. Alternatively, the simulated node may be modified by excluding a preliminary node, that may have been previously included in the simulated node, from the simulated node. In some embodiments, a simulated node may be deleted from the executable graph-based model 100 based on deletion of a corresponding object from the external system 602. Alternatively, the simulated node may be deleted based on a stimulus indicative of such an operation to be executed on the object or the simulated node.

It will be appreciated by a person skilled in the art that a preliminary node and an associated simulation overlay node form a simulated node. Therefore, the simulated node is considered to logically include the simulation overlay node. Hence, based on loading of the simulated node, the simulation overlay node may also be loaded. Also, based on unloading of the simulated node, the simulation overlay node may also be unloaded.

Although FIG. 6 depicts creation of a simulated node for each preliminary node, the simulated node may be created for a group of preliminary nodes without deviating from the scope of the disclosure. Notably, in such scenarios, attributes of each of the group of preliminary nodes become attributes of the simulated node.

It will be apparent to a person skilled in the art that operations being performed by a node of the executable graph-based model 100 are realized by the processing circuitry (for example, the controller module 206, the transaction module 208, the simulation management module 216, or any other component of the overlay system 202) while using the node.

Although FIG. 6 depicts a single external system being implemented by the overlay system 202, in other embodiments, the overlay system 202 may implement a plurality of external systems. Such implementation of the plurality of external systems may be simultaneous. In addition, the external systems may be separated from each other or may be interlinked with each other.

It will be appreciated by a person skilled in the art that a number of simulated nodes (for example, simulated vertex nodes, simulated edge nodes, simulated role nodes, simulated overlay nodes, or the like) to be created for simulating data objects and function objects of an external system may be dependent on a requirement of segregation among the data objects and the function objects. In an example, an external system may have an object including medical data and diagnosis processes that may generate a diagnosis using the medical data. Therefore, the object may be segregated into a medical data object and a diagnosis function object. The medical data object may include data associated with various health parameters and the diagnosis function object may include one or more operations that may be executed using the data associated with the medical data object to determine a diagnosis for a patient associated with the medical data object. In such an example, to implement the external system by way of the overlay system 202, a simulated vertex node may be created for the patient, one or more simulated vertex nodes may be created to simulate data associated with the medical data object, a simulated edge node or a generic edge node may be created for associating the simulated vertex node simulating the patient with the one or more simulated vertex nodes simulating the data associated with the medical data object, and one or more simulated overlay nodes may be created to simulate the operations associated with the diagnosis function object. Notably, a number of simulated vertex nodes required to simulate the data associated with the medical data object may be dependent on a level of segregation required while simulating the medical data object. A medical test report may be represented as a single simulated vertex node. Alternatively, various findings of the medical test report may be simulated as different simulated vertex nodes. Similarly, a number of simulated overlay nodes required to simulate one or more functions in the diagnosis function object may be dependent on a level of segregation required while simulating the diagnosis function object. Each operation in the diagnosis function object may be simulated as a simulated overlay node. Alternatively, two or more operations in the diagnosis function object may be simulated collectively as a simulated overlay node.

To summarize, FIG. 6 describes various features associated with creation and maintenance of simulated nodes for implementing an external system by way of the overlay system 202. As mentioned previously, a simulation overlay node is crucial for generation of a simulated node. The simulation overlay node provides the simulated node with its node structure. Also, the node structure of the simulated node conforms with an associated object. The description now moves towards various concepts associated with the simulation overlay nodes and how the node structure of a preliminary node may be customized to create the simulated node.

Figure 7:
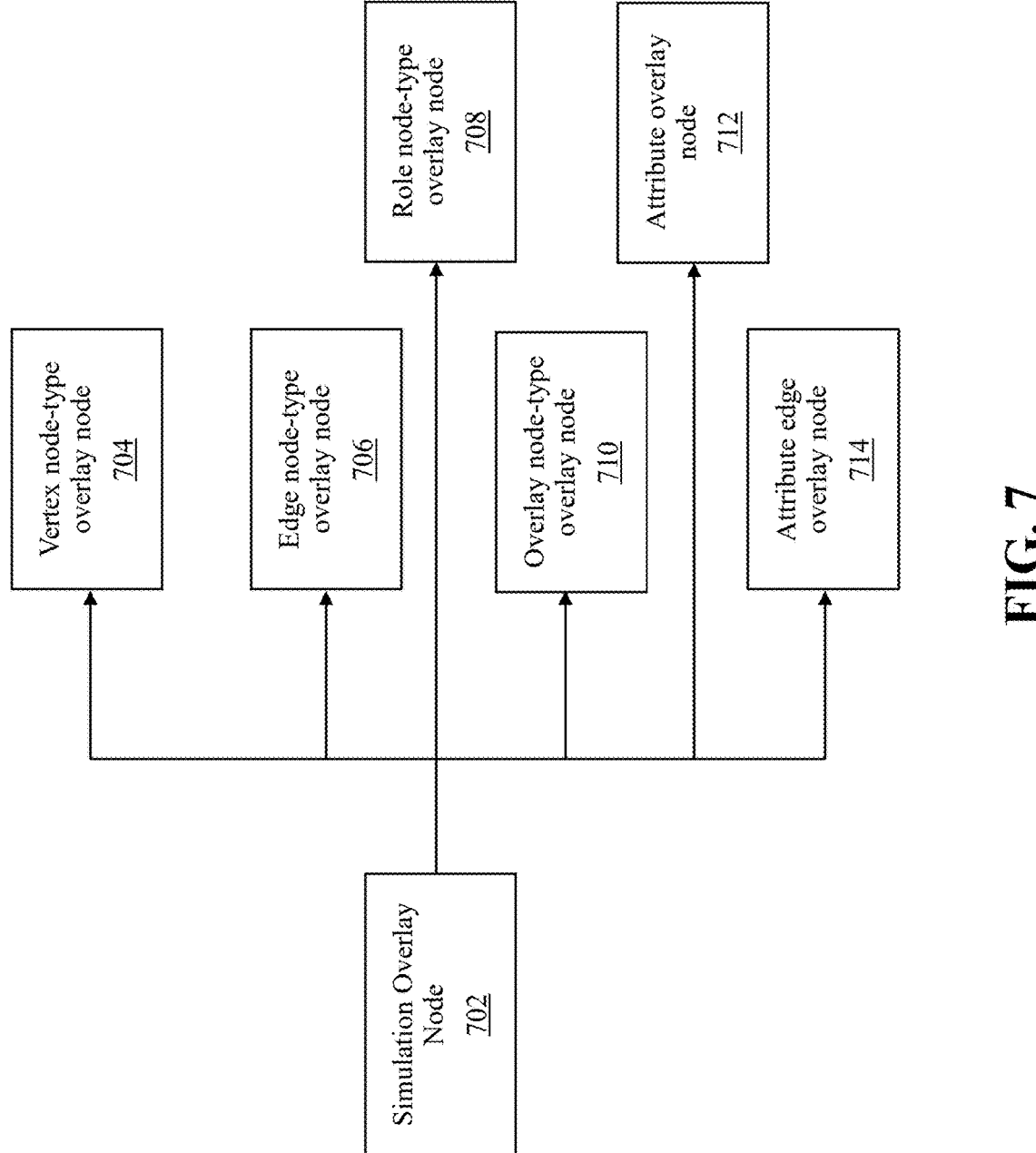
FIG. 7 is a block diagram that depicts types of simulation overlay nodes, consistent with disclosed embodiments of the present disclosure.

FIG. 7 is a block diagram 700 that depicts types of simulation overlay nodes, consistent with disclosed embodiments of the present disclosure. Referring to FIG. 7, a simulation overlay node 702 is depicted. A node-type of the simulation overlay node 702 may be a vertex overlay node-type, an edge overlay node-type, a role overlay node-type, an overlay overlay node-type, an attribute overlay node-type, or an attribute edge overlay node-type. Based on the node-type of the simulation overlay node 702 being the vertex overlay node-type, the simulation overlay node 702 may be a vertex node-type overlay node 704. Based on the node-type of the simulation overlay node 702 being the edge overlay node-type, the simulation overlay node 702 may be an edge node-type overlay node 706. Based on the node-type of the simulation overlay node 702 being the role overlay node-type, the simulation overlay node 702 may be a role node-type overlay node 708. Based on the node-type of the simulation overlay node 702 being the overlay overlay node-type, the simulation overlay node 702 may be an overlay node-type overlay node 710. Based on the node-type of the simulation overlay node 702 being the attribute overlay node-type, the simulation overlay node 702 may be an attribute overlay node 712. Based on the node-type of the simulation overlay node 702 being the attribute edge overlay node-type, the simulation overlay node 702 may be an attribute edge overlay node 714.

As mentioned previously, a simulation overlay node when associated with a preliminary node, modifies a node structure of the preliminary node. Additionally, the node structure of the preliminary node is modified based on the node-type of the simulation overlay node.

In some embodiments, the node-type of the simulation overlay node 702 may be the vertex overlay node-type. In such embodiments, the simulation overlay node 702 may be the vertex node-type overlay node 704. The vertex node-type overlay node 704 may refer to an overlay node that may include processing logic that when executed on an associated preliminary node modifies a node structure of the preliminary node to match a node (for example, the generic node 302) with the vertex node-type 328. Based on an associated simulation overlay node being the vertex node-type overlay node 704 (i.e., the vertex overlay node-type), the node structure of the preliminary node is modified to match a node structure of the node (for example, the generic node 302) with the vertex node-type 328. Consequently, a simulated node is generated that may be a simulated vertex node. The simulated vertex node may act as a generic node, with the vertex node-type 328, that simulates an object associated with the external system.

In some embodiments, the node-type of the simulation overlay node 702 may be the edge overlay-node type. In such embodiments, the simulation overlay node 702 may be the edge node-type overlay node 706. The edge node-type overlay node 706 may refer to an overlay node that may include processing logic that when executed on an associated preliminary node modifies a node structure of the preliminary node to match a node (for example, the node 302) with the edge node-type 330. Based on an associated simulation overlay node being the edge node-type overlay node 706 (i.e., the edge overlay node-type), the node structure of the preliminary node is modified to match a node structure of the node (for example, the generic node 302) with the edge node-type 330. Consequently, a simulated node is generated that may be a simulated edge node. The simulated edge node may act as a generic node, with the edge node-type 330, that simulates an object associated with the external system.

In some embodiments, the node-type of the simulation overlay node 702 may be the role overlay-node type. In such embodiments, the simulation overlay node 702 may be the role node-type overlay node 708. The role node-type overlay node 708 may refer to an overlay node that may include processing logic that when executed on an associated preliminary node modifies a node structure of the preliminary node to match a node (for example, the generic node 302) with the role node-type 334. Based on an associated simulation overlay node being the role node-type overlay node 708 (i.e., the role overlay node-type), the node structure of the preliminary node is modified to match a node structure of the node (for example, the generic node 302) with the role node-type 334. Consequently, a simulated node is generated that may be a simulated role node. The simulated role node may act as a generic node, with the role node-type 334, that simulates an object associated with the external system.

In some embodiments, the node-type of the simulation overlay node 702 may be the overlay overlay node-type. In such embodiments, the simulation overlay node 702 may be the overlay node-type overlay node 710. The overlay node-type overlay node 710 may refer to an overlay node that may include processing logic that when executed on an associated preliminary node modifies a node structure of the preliminary node to match a node (for example, the generic node 302) with the overlay node-type 332. Based on an associated simulation overlay node being the role node-type overlay node 708 (i.e., the overlay overlay node-type), the node structure of the preliminary node is modified to match a node structure of the node (for example, the generic node 302) with the overlay node-type 332. Consequently, a simulated node is generated that may be a simulated overlay node. The simulated overlay node may act as a generic node, with the overlay node-type 332, that simulates an object associated with the external system.

In some embodiments, the node-type of the simulation overlay node 702 may be the attribute overlay node-type. In such embodiments, the simulation overlay node 702 may be the attribute overlay node 712. The attribute overlay node 712 may refer to an overlay node that may include processing logic that when executed on an associated preliminary node modifies a node structure of the preliminary node to match an attribute object in the executable graph-based model 100 that stores one or more attribute values of an associated node (for example, a simulated node, a generic node, or the like). Based on an associated simulation overlay node being the attribute overlay node 712 (i.e., the attribute overlay node-type), the node structure of the preliminary node is modified to match an attribute object. Consequently, a simulated node is generated that may be a simulated attribute object. The simulated attribute object may act as an attribute object that stores attribute value(s) of an object dataset associated with an object of the external system.

In some embodiments, the node-type of the simulation overlay node 702 may be the attribute edge overlay node-type. In such embodiments, the simulation overlay node 702 may be the attribute edge overlay node 714. The attribute edge overlay node 714 may refer to an overlay node that may include processing logic that when executed on an associated preliminary node modifies a node structure of the preliminary node to match an attribute edge of the executable graph-based model 100. An attribute edge couples an attribute object with an associated node (for example, a simulated node, a generic node, or the like) such that the attribute object stores an attribute value associated with the node. Based on an associated simulation overlay node being the attribute edge overlay node 714 (i.e., the attribute edge overlay node-type), the node structure of the preliminary node is modified to match an attribute edge. Consequently, a simulated node is generated that may be a simulated attribute edge. The simulated attribute edge may act as an attribute edge that couples an attribute object with a corresponding node.

Further, the processing circuitry (for example, the simulation management module 216) may be configured to determine a node-type of a simulation overlay node to be associated with a preliminary node based on an object (for example, the object 604) of an external system (for example, the external system 602) being interfaced by the preliminary node. Notably, the object may be a data object or function object. In an instance, when the object may be non-executable data associated with the external system, the object may be the data object. The non-executable data may be in textual form, numeric form, alphanumeric form, symbolic form, audio form, video form, graphical form, or any other form of representing data. In another instance, when the object may be executable data (i.e., processing logic) optionally along with non-executable data associated with the external system, the object may be the function object. The executable data may be in a command, an instruction, a query, or the like.

In some embodiments, when the object interfaced by the preliminary node may be the data object, the processing circuitry (for example, the simulation management module 216) may determine that the simulation overlay node to be associated therewith may be the vertex node-type overlay node 704, the edge node-type overlay node 706, the role node-type overlay node 708, the attribute overlay node 712, or the attribute edge overlay node 714.

In some embodiments, when the object interfaced by the preliminary node may be the function object, the processing circuitry (for example, the simulation management module 216) may determine that the simulation overlay node to be associated therewith may be the overlay node-type overlay node 710.

Based on the data object representing an entity (for example, a person, an organization, or the like), the processing circuitry (for example, the simulation management module 216) may determine that the simulation overlay node to be associated therewith may be the vertex node-type overlay node 704. Based on the data object representing an association between two or more entities, the processing circuitry (for example, the simulation management module 216) may determine that the simulation overlay node to be associated therewith may be the edge node-type overlay node 706. Based on the data object representing a capacity in which the two or more entities may be associated, the processing circuitry (for example, the simulation management module 216) may determine that the simulation overlay node to be associated therewith may be the role node-type overlay node 708. Based on the data object representing the executable data, the processing circuitry (for example, the simulation management module 216) may determine that the simulation overlay node to be associated therewith may be the overlay node-type overlay node 710. Further, based on the data object representing information associated with another object of the external system, the processing circuitry (for example, the simulation management module 216) may determine that the simulation overlay node to be associated therewith may be the attribute overlay node 712. Based on the data object representing information that associates information associated with an object to the object, the processing circuitry (for example, the simulation management module 216) may determine that the simulation overlay node to be associated therewith may be the attribute edge overlay node 714.

To summarize, the overlay system 202 provides for various node-types of the simulation overlay node (for example, the vertex overlay node-type, the edge overlay node-type, the role overlay node-type, the overlay overlay node-type, the attribute overlay node-type, and the attribute edge overlay node-type). This allows any type of data and/or processing logic associated with the external system 602 to be simulated and implemented by way of the overlay system 202. The description now discusses an exemplary scenario depicting the application of the aforementioned concepts/features associated with the simulated nodes and simulation overlay nodes.

Figure 8:
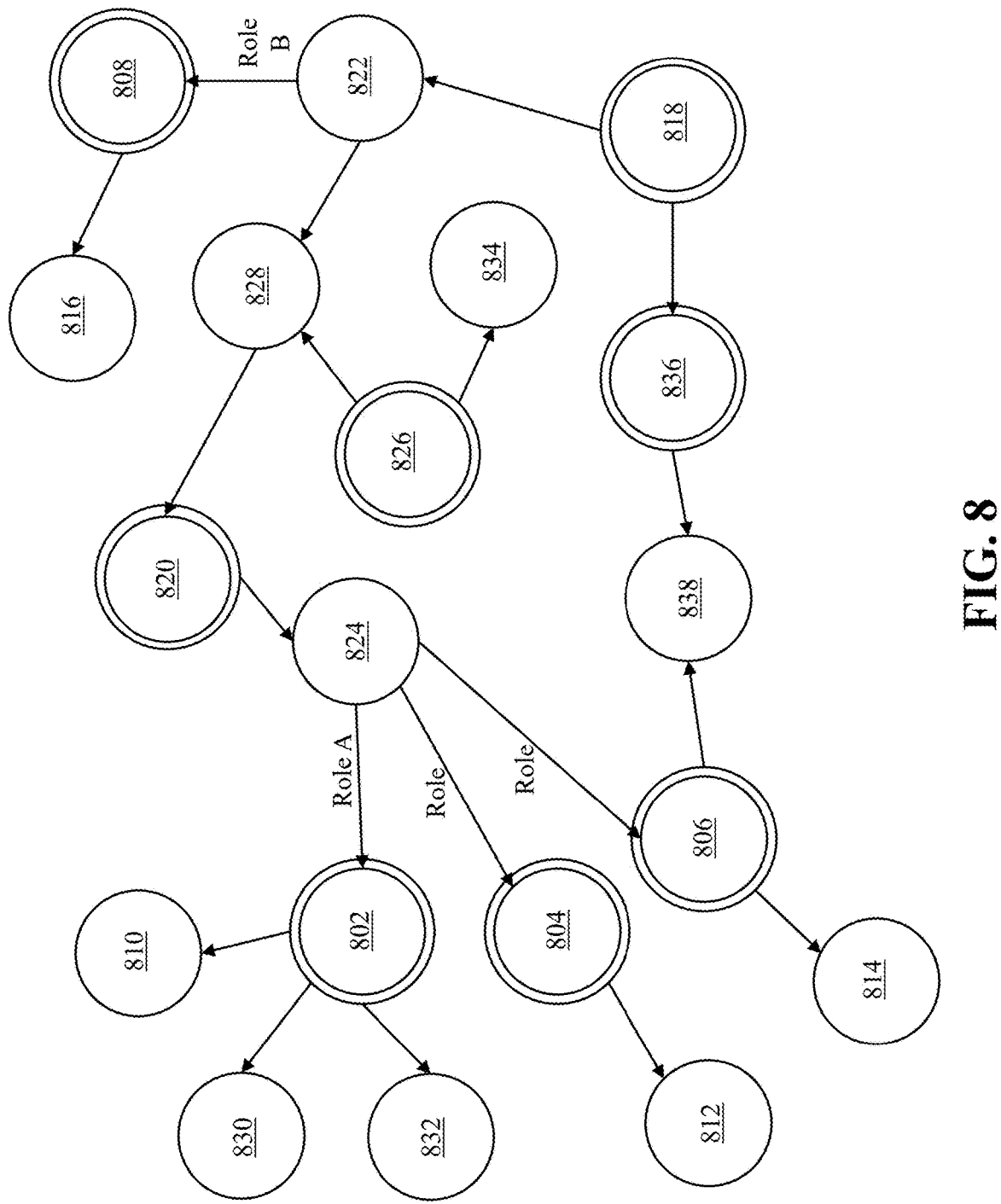
FIG. 8 is a block diagram that depicts an exemplary implementation of an external system by way of the executable graph-based model, consistent with disclosed embodiments of the present disclosure.

FIG. 8 is a block diagram 800 that depicts an exemplary implementation of an external system by way of the executable graph-based model 100, consistent with disclosed embodiments of the present disclosure. Referring to FIG. 8, shown are preliminary nodes 802-808 associated with simulation overlay nodes 810-816, respectively. The simulation overlay nodes 810-816 may be vertex node-type overlay nodes. Additionally, simulated nodes, associated with the simulation overlay nodes 810-816 may be simulated vertex nodes. Further depicted are preliminary nodes 818 and 820 associated with simulation overlay nodes 822-824, respectively, which are edge node-type overlay nodes. Therefore, simulated nodes formed by the preliminary nodes 818 and 820 associated with the simulation overlay nodes 822-824, respectively, are simulated edge nodes. Further, a preliminary node 826 is depicted which is associated with a simulation overlay node 828 which is a role node-type overlay node. The preliminary node 826 associated with the role node-type overlay node (i.e., the simulation overlay node 828) forms a simulated role node.

The preliminary node 802 (hereinafter, simulated vertex node 802) is extended by way of overlay nodes 830 and 832 (for example, a simulated overlay node, a function overlay node). Also, the simulated vertex node 802 is associated with the preliminary node 808 (hereinafter, simulated vertex node 808) via preliminary nodes 820 and 818 (hereinafter, simulated edge nodes 820 and 818). The simulated vertex node 802 is associated with the simulated edge node 820 by way of the simulation overlay node 824 associated with the simulated edge node 820. The simulated vertex node 802 is associated with the simulated vertex node 808 by way of a role A included in the simulated edge node 820. The simulated vertex node 808 may be associated with the simulated vertex node 802 by way of the simulated edge node 818. Further, the simulated vertex node 808 may be associated with the simulated vertex node 802 by way of a role included in the simulated node 826 (hereinafter, simulated role node 826). The simulated vertex node 808 is associated with the simulated role node 826 based on association of the simulated edge node 818 with the simulation overlay node 828 of the simulated role node 826 via the simulation overlay node 822. The simulated node 808 is associated with the simulated role node 826 by way of a role B. Also, the simulated role node 826 may be extended by an overlay node 834 (for example, a simulated overlay node and a function overlay node).

Similarly, the simulated vertex nodes 804 and 806 may be associated with the simulated node 808 via the simulated edge nodes 818 and 820. As shown, the simulated edge node 818 may be further extended by way of an overlay node 836 (for example, a simulated overlay node and a function overlay node) which is further extended by another overlay node 838 (for example, a simulated overlay node and a function overlay node). The overlay node 838 may also extend the simulated vertex node 806 such that the overlay node 838 may be shared by the simulated vertex node 806 and the overlay node 836.

Having discussed simple structures formed using the simulated nodes and the simulation overlay nodes, the description now moves toward complex structures formed using the simulated nodes and the simulation overlay nodes.

Figure 9:
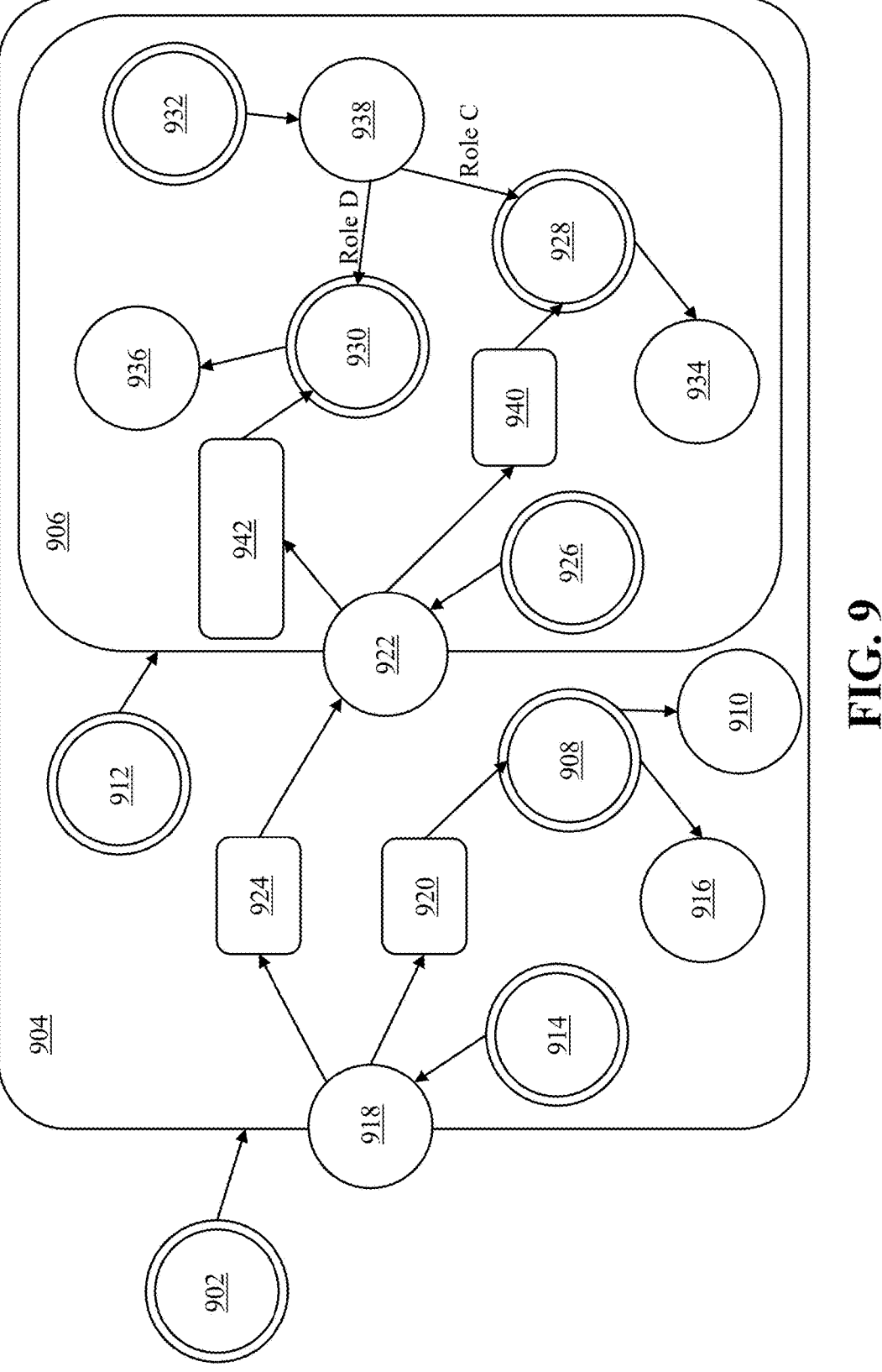
FIG. 9 is a block diagram that depicts composite structures of the executable graph-based model, consistent with disclosed embodiments of the present disclosure.

FIG. 9 is a block diagram 900 that depicts composite structures of the executable graph-based model 100, consistent with disclosed embodiments of the present disclosure. A composite structure may encompass a set of simulated nodes and/or a set of generic nodes. A composite structure is a logical structure within the executable graph-based model 100 that may group two or more simulated nodes and/or generic nodes. Such grouping of the two or more simulated nodes and/or generic nodes may be performed based on a logical relationship and/or similarity among the two or more simulated nodes and/or generic nodes. Examples of the composite structure may include, but are not limited to, a graph and a container.

The processing circuitry (for example, the simulation management module 216) may generate a composite structure based on an association among the two or more simulated nodes and/or generic nodes. The two or more simulated nodes and/or generic nodes may be encompassed within the composite structure based on such association. For the generation of the composite structure, a group overlay node may be instantiated in association with the two or more simulated nodes and/or generic nodes. The association of the group overlay node with the two or more simulated nodes and/or generic nodes may facilitate the inclusion of the first simulated node in the composite structure. The group overlay node may be a leaf group overlay node or a composite overlay node.

In some embodiments, a composite structure may be a hierarchical structure. The hierarchical structure may include parent nodes and leaf nodes. Based on a node encompassed in the composite structure being a parent node, the node may be associated with a composite overlay node. Alternatively, based on the node encompassed in the composite structure being a leaf node, the node may be associated with a leaf group overlay node.

In some embodiments, the processing circuitry (for example, the simulation management module 216) may be configured to instantiate a contract overlay node in association with the composite structure. The contract overlay node may implement access control associated with the composite structure. The control overlay node may include processing logic that when executed on the composite structure may implement a set of rules associated with access of the two or more simulated nodes and/or generic nodes included in the composite structure. The access control associated with the composite structure may be public access, private access, or protected access.

In some embodiments, the access control may be same for each simulated node and/or generic node encompassed within the composite structure. In some embodiments, the access control may be different for one or more simulated nodes and/or generic nodes encompassed within the composite structure.

In some embodiments, when the access control may be public access, the simulated nodes and/or the generic nodes included in the composite structure may be accessed publicly without any restriction. In some embodiments, when the access control may be private access, the simulated nodes and/or the generic nodes included in the composite structure may be accessed by users of the overlay system 202 or the external system having permission to use the simulated nodes and/or generic nodes included with the composite structure. In some embodiments, when the access control may be protected access, different simulated nodes and/or generic nodes included in the composite structure may be accessible to different users of the overlay system 202 or the external system having permission to use the corresponding simulated nodes and/or generic nodes included within the composite structure.

As shown, a node 902 is associated with a composite structure 904 that further includes a composite structure 906. The composite structure 904 may be a graph and the composite structure 906 may be a container. The nodes (for example, simulated nodes and generic nodes) encompassed with the composite structures 904 and 906 may be associated with corresponding group overlay nodes. For example, a node 908 included in the composite structure 904 is associated with a leaf group overlay node 910. The composite structure 904 is shown to further include nodes 912 and 914 such that the nodes 912 and 914 may be generic nodes and the node 908 may be a simulated node. The node 908 may be associated with a simulation overlay node 916 with a vertex overlay node-type. Further, the composite structure 904 is associated with a contract overlay node 918. The contract overlay node 918 implements a set of rules for accessing the nodes 908, 912, and 914. Therefore, the node 902 may access the nodes 908, 912, and 914 in accordance with the set of rules implemented by the contract overlay node 918. Notably, the set of rules may be specific to each of the nodes 908, 912, and 914. As shown, the contract overlay node 918 implements node attribute access for the node 908 based on an associated set of rules 920.

As shown, the composite structure 904 encompasses the composite structure 906. The composite structure 906 may be associated with a contract overlay node 922. The contract overlay node 922 may be associated with the contract overlay node 918. The contract overlay node 918 may include an additional set of rules 924 for performing access control for nodes included within the composite structure 906. The nodes included within the composite structure 906 may be accessed by the node 902 in accordance with the additional set of rules 924 associated with the contract overlay node 918 and one or more access constraints defined by the contract overlay node 922.

As shown, the composite structure 906 includes nodes 926, 928, 930, and 932. The node 926 is a generic node and the nodes 928, 930, and 932 are simulated nodes. The node 928 is associated with a simulation overlay node 934 of the vertex overlay node-type. Therefore, the node 928 is a simulated vertex node. The node 928 is associated with a simulation overlay node 934 of vertex overlay node-type. Therefore, the node 926 is a simulated vertex node. Similarly, the node 928 is a simulated vertex node (hereinafter, the simulated vertex node 926). The node 928 is associated with a simulation overlay node 934 of the vertex overlay node-type. Therefore, the node 928 is a simulated vertex node (hereinafter, the simulated vertex node 928). The node 932 is associated with a simulation overlay node 938 of the edge overlay node-type. Therefore, the node 932 is a simulated edge node (hereinafter, the simulated edge node 932). The simulated vertex nodes 928 and 930 are associated by way of the simulated edge node 932. As shown, the simulated vertex node 928 is associated with the simulated edge node 932 via the simulation overlay node 938 which is a logical portion of the simulated edge node 932. The simulated edge node 932 includes a 'Role C' for the simulated vertex node 928. Similarly, the simulated vertex node 930 is associated with the simulated edge node 932 via the simulation overlay node 938 which is a logical portion of the simulated edge node 932. The simulated edge node 932 includes a 'Role D' for the simulated vertex node 930. The simulated vertex node 928 may be accessed by the node 902 based on the additional set of rules 924 and a set of rules 940. Additionally, attributes of the node 930 included within the composite structure 906 may be accessed by the node 902 in accordance with the additional set of rules 924 and a set of rules 942 associated with the contract overlay node 922.

In some embodiments, the processing circuitry (for example, the stimuli management module 212) may receive a stimulus (for example, the stimulus 230) indicative of an operation associated with the simulated node 908. In such an embodiment, the processing circuitry (for example, the controller module 206) may be configured to execute an operation associated with the stimulus using the simulated node 908 based on the composite structure 904. Notably, the node 908 may be accessed to process the stimulus based on the set of rules 920 defined by the contract overlay node 918 associated with the composite structure 904 and the simulated node 908.

To summarize, FIG. 9 depicts various concepts associated with composite structures. It will be apparent to a person skilled in the art that the composite structure described herein is exemplary and does not limit the scope of the disclosure. In other embodiments, the composite structure may have different structures and may include different nodes (for example, simulated nodes, generic nodes, function overlay nodes, simulation overlay nodes, or the like). Having discussed various concepts associated with the implementation of the external system by way of the overlay system 202, the description now moves towards a use-case scenario for implementing an external system by way of the overlay system 202.

Figure 10:
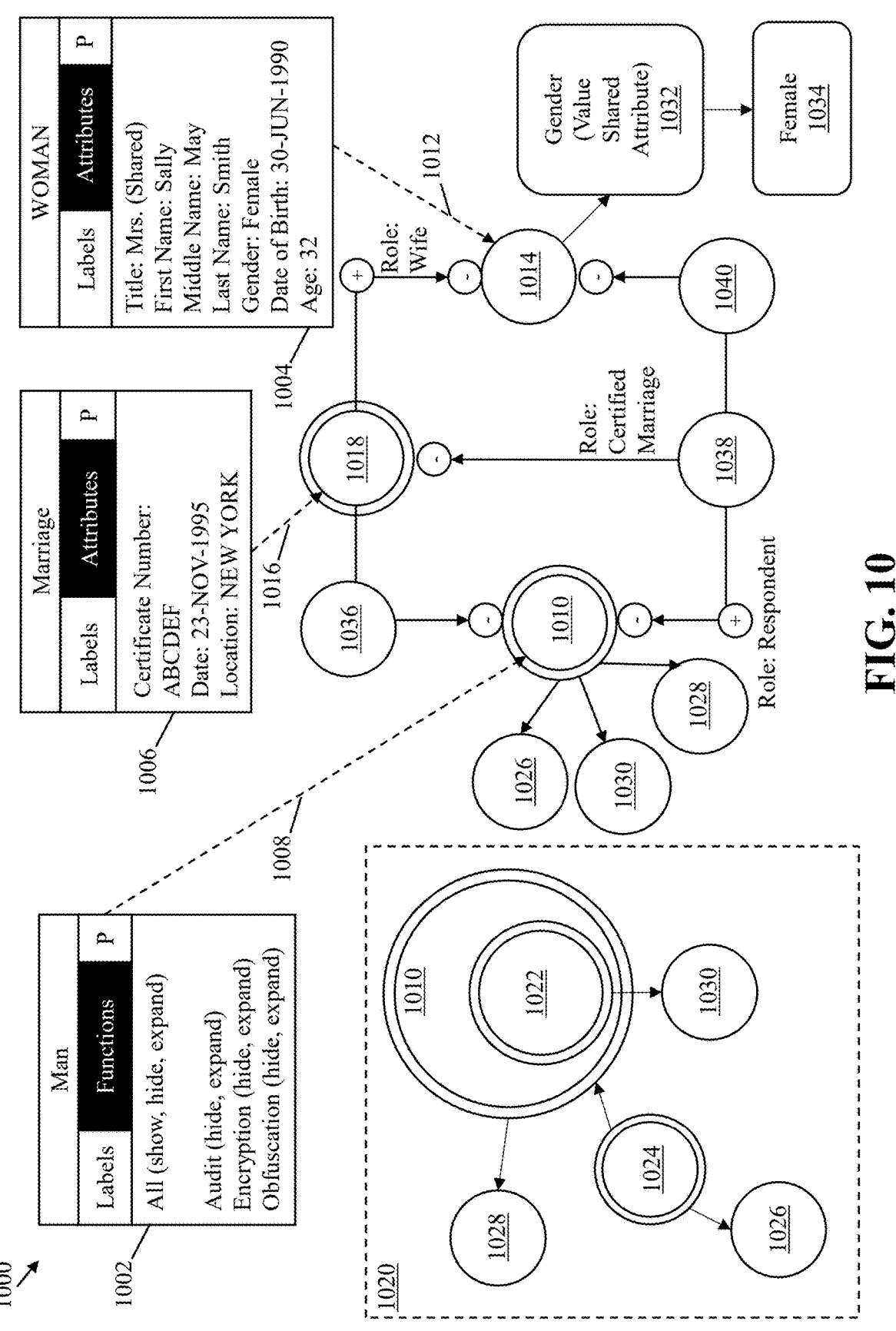
FIG. 10 is a schematic diagram that depicts an exemplary scenario of implementation of an external system using the overlay system, consistent with disclosed embodiments of the present disclosure.

FIG. 10 is a schematic diagram 1000 that depicts an exemplary scenario of implementation of an external system using the overlay system 202, consistent with disclosed embodiments of the present disclosure. Referring to FIG. 10, an external system (not shown) includes object datasets 1002 and 1004 associated with entities 'Man' and 'Woman', respectively. The object dataset 1002 may include various labels, functions, and an identifier associated with the entity 'Man'. For the sake of brevity, only the functions associated with the entity 'Man' are depicted herein. Similarly, the object dataset 1004 may include various labels, attributes, and an identifier associated with the entity 'Woman'. For the sake of brevity, only the attributes associated with the entity 'Woman' are depicted herein. Further, the entities 'Man' and 'Woman' are associated by way of marriage which may be represented as an object in the external system such that the object representing 'Marriage' between the entities 'Man' and 'Woman' may be associated with the objects representing the entities 'Man' and 'Woman'. The external system may include an object dataset 1006 associated with the object representing 'Marriage'. The object dataset 1006 may include various labels, attributes, and an identifier associated with the object representing 'Marriage'. For the sake of brevity, only the attributes associated with the object representing 'Marriage' are depicted herein.

For implementing the external system by way of the overlay system 202, simulated nodes may be generated for the objects 'Man', 'Woman', and 'Marriage' of the external system. As shown by way of a dotted arrow 1008, a simulated vertex node 1010 may be generated to simulate the object 'Man' in the overlay system 202. Similarly, as shown by way of a dotted arrow 1012, a simulated vertex node 1014 may be generated to simulate the object 'Woman'. Further, as shown by way of a dotted arrow 1016, a simulated edge node 1018 may be created to simulate the object 'Marriage'. For the sake of brevity, a preliminary node and a simulation overlay node forming a simulated node is not depicted herein and the simulated node is represented as a single node.

The simulated vertex node 1010 may be generated as described in conjunction with FIG. 6. A logical structure of the simulated node 1010 is shown within a dotted box 1020. As shown, the simulated node 1010 may logically include a preliminary node 1022. Also, the functions (for example, an all function, an audit function, an encryption function, and an obfuscation function) included in the object dataset 1002 may be simulated in the form of simulated overlay nodes associated with the simulated node 1010. The audit function may be simulated by way of a generic node 1024 extended by an audit overlay node 1026 which may be a simulated overlay node. The generic node 1024 may be associated with the simulated vertex node 1010 and hence the audit overlay node 1026 may be further associated with the simulated vertex node 1010. Therefore, the audit overlay node 1026 may be associated with the simulated vertex node 1010 via an intermediate node (for example, the generic node 1024).

Further, the simulated vertex node 1010 may be in a direct association (i.e., without an intermediate node) with an obfuscation overlay node 1028 that may simulate the obfuscation function included in the object dataset 1002. Similarly, the simulated vertex node 1010 may be in a direct association (i.e., without an intermediate node) with an encryption overlay node 1030 that may simulate the encryption function included in the object dataset 1002.

The simulated vertex node 1014 simulating the object 'Woman' may be generated in a similar manner. The attributes included in the object dataset 1004 may be mapped to a set of attributes associated with a preliminary node included in the simulated node 1014. For example, an attribute 'Gender' with attribute value 'Female' may be simulated as a value shared attribute 1032 with the attribute value 'Female' stored at an attribute object 1034 that may be shared with one or more other nodes (for example, simulated nodes and/or generic nodes).

The simulated edge node 1018 may be generated similarly to the generation of the simulated vertex nodes 1010 and 1014. The simulated edge node 1018 may couple/associate the simulated vertex nodes 1010 and 1014. The simulated edge node 1018 may also be indicative of roles associated with simulated vertex nodes 1010 and 1014. The simulated edge node 1018 simulating the object 'Marriage' may have a role 'Husband' associated with the simulated node 1010 representing the object 'Man' and another role 'Wife' for the simulated node 1014 representing the object 'Woman'. As shown, the role 'Wife' may be integral to the simulated edge node 1018 whereas the role 'Husband' may be realized by way of a simulated role node 1036 associated with the simulated edge node 1018 and the simulated vertex node 1010. The object dataset 1006 may be represented as a set of attributes (not shown) associated with the simulated edge node 1018.

In some embodiments, the Man and the Woman represented by the simulated nodes 1010 and 1014, respectively, may get divorced. Based on such an event, a simulated edge node 1038 representing an object 'Divorce' of the external system may be generated within the overlay system 202. The simulated edge node 1038 may associate the simulated vertex nodes 1010 and 1014. The simulated edge node 1038 simulating the object 'Divorce' may have a role 'Respondent' associated with the simulated node 1010 representing the object 'Man' and another role 'Petitioner' for the simulated node 1014 representing the object 'Woman'. As shown, the role 'Respondent' may be integral to the simulated edge node 1038 whereas the role 'Petitioner' may be realized by way of a simulated role node 1040 associated with the simulated edge node 1038 and the simulated vertex node 1014. In addition, the simulated edge node 1038 may be associated with the simulated edge node 1018 with a role 'Certified Marriage'. Such association between the simulated edge nodes 1018 and 1038 may be indicative of (i) a previously existing marriage association between the 'Man' and the 'Woman' represented by the simulated vertex nodes 1010 and 1014, and (ii) dissolution of the marriage association based on a currently existing divorce association between the 'Man' and the 'Woman' represented by the simulated vertex nodes 1010 and 1014.

Beneficially, the structure of the overlay system 202 allows for creation of new simulated nodes to reflect changes in a current state of the external system without making significant changes in pre-existing simulated nodes. This allows for a seamless implementation and maintenance of the implemented external system by way of the overlay system 202.

Having discussed a use-case scenario of the overlay system 202 disclosed herein, the description now moves towards a computing system that may be used for such implementations of the executable graph-based model 100.

Figure 11:
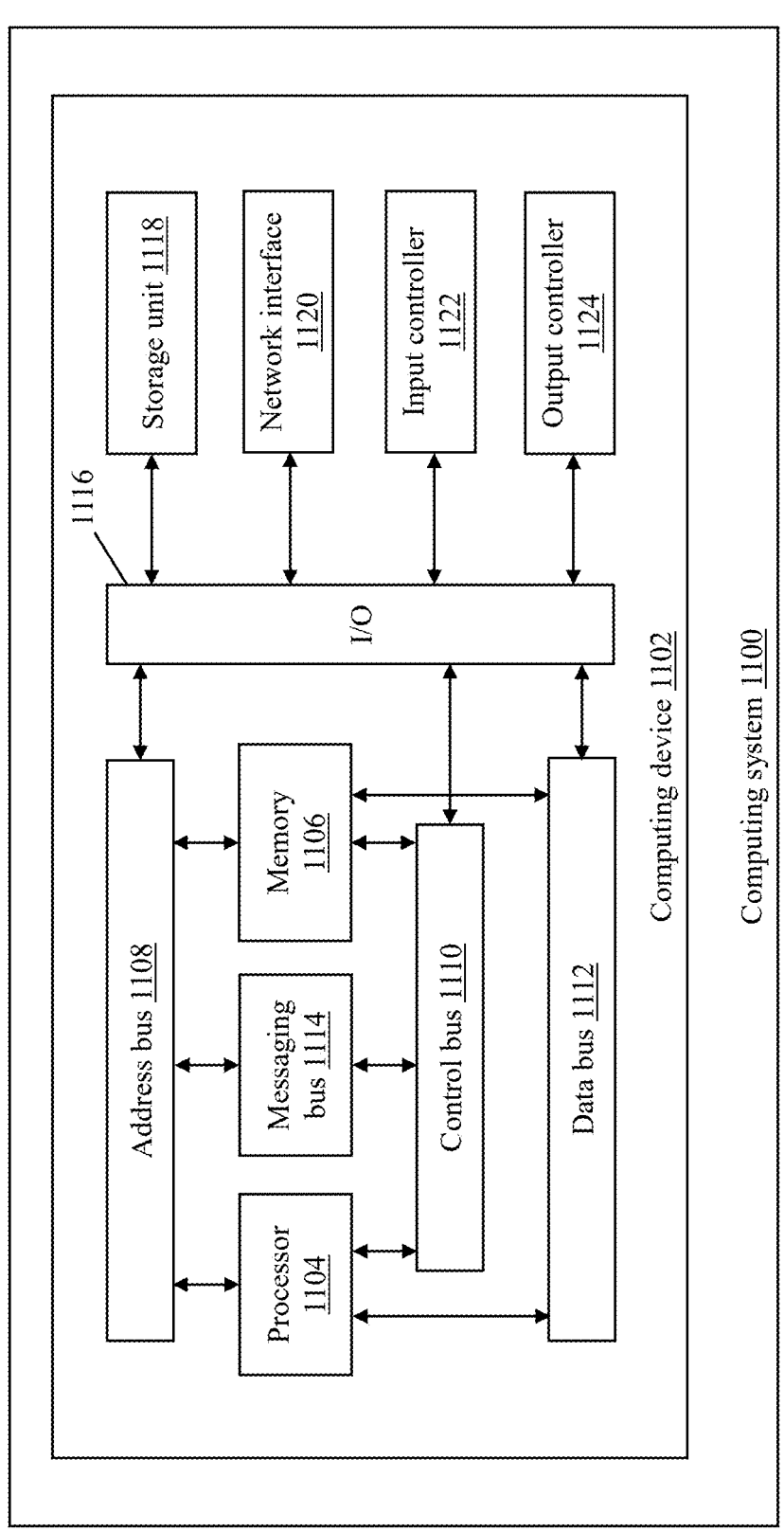
FIG. 11 shows an example computing system for carrying out methods of the present disclosure, consistent with disclosed embodiments of the present disclosure.

FIG. 11 shows an example computing system 1100 for carrying out the methods of the present disclosure, consistent with disclosed embodiments of the present disclosure. Specifically, FIG. 11 shows a block diagram of an embodiment of the computing system 1100 according to example embodiments of the present disclosure.

The computing system 1100 may be configured to perform any of the operations disclosed herein, such as, for example, any of the operations discussed with reference to the functional modules described in relation to FIG. 2. The computing system 1100 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1100 is a distributed system configured to function using multiple computing machines interconnected via a data network or bus system.

The computing system 1100 includes computing devices (such as a computing device 1102). The computing device 1102 includes one or more processors (such as a processor 1104) and a memory 1106. The processor 1104 may be any general-purpose processor(s) configured to execute a set of instructions. For example, the processor 1104 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 1104 may be multiple processing units, a single processing core, multiple processing cores, special purpose processing cores, co-processors, or any combination thereof. The processor 1104 may be communicatively coupled to the memory 1106 via an address bus 1108, a control bus 1110, a data bus 1112, and a messaging bus 1111.

The memory 1106 may include non-volatile memories such as a read-only memory (ROM), a programable read-only memory (PROM), an erasable programmable read-only memory (EPROM), a flash memory, or any other device capable of storing program instructions or data with or without applied power. The memory 1106 may also include volatile memories, such as a random-access memory (RAM), a static random-access memory (SRAM), a dynamic random-access memory (DRAM), and a synchronous dynamic random-access memory (SDRAM). The memory 1106 may include single or multiple memory modules. While the memory 1106 is depicted as part of the computing device 1102, a person skilled in the art will recognize that the memory 1106 can be separate from the computing device 1102.

The memory 1106 may store information that can be accessed by the processor 1104. For instance, the memory 1106 (e.g., one or more non-transitory computer-readable storage mediums, memory devices) may include computer-readable instructions (not shown) that can be executed by the processor 1104. The computer-readable instructions may be software written in any suitable programming language or may be implemented in hardware. Additionally, or alternatively, the computer-readable instructions may be executed in logically and/or virtually separate threads on the processor 1104. For example, the memory 1106 may store instructions (not shown) that when executed by the processor 1104 cause the processor 1104 to perform operations such as any of the operations and functions for which the computing system 1100 is configured, as described herein. Additionally, or alternatively, the memory 1106 may store data (not shown) that can be obtained, received, accessed, written, manipulated, created, and/or stored. The data can include, for instance, the data and/or information described herein in relation to FIGS. 1-10. In some implementations, the computing device 1102 may obtain from and/or store data in one or more memory device(s) that are remote from the computing system 1100.

The computing device 1102 may further include an input/output (I/O) interface 1116 communicatively coupled to the address bus 1108, the control bus 1110, and the data bus 1112. The data bus 1112 and messaging bus 1114 may include a plurality of tunnels that may support parallel execution of messages by the overlay system 202. The I/O interface 1116 is configured to couple to one or more external devices (e.g., to receive and send data from/to one or more external devices). Such external devices, along with the various internal devices, may also be known as peripheral devices. The I/O interface 1116 may include both electrical and physical connections for operably coupling the various peripheral devices to the computing device 1102. The I/O interface 1116 may be configured to communicate data, addresses, and control signals between the peripheral devices and the computing device 1102. The I/O interface 1116 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, Fire Wire, various video buses, or the like. The I/O interface 1116 is configured to implement only one interface or bus technology. Alternatively, the I/O interface 1116 is configured to implement multiple interfaces or bus technologies. The I/O interface 1116 may include one or more buffers for buffering transmissions between one or more external devices, internal devices, the computing device 1102, or the processor 1104. The I/O interface 1116 may couple the computing device 1102 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1116 may couple the computing device 1102 to various output devices, including video displays, speakers, printers, projectors, tactile feedback devices, automation control, robotic components, actuators, motors, fans, solenoids, valves, pumps, transmitters, signal emitters, lights, and so forth.

The computing system 1100 may further include a storage unit 1118, a network interface 1120, an input controller 1122, and an output controller 1124. The storage unit 1118, the network interface 1120, the input controller 1122, and the output controller 1124 are communicatively coupled to the central control unit (e.g., the memory 1106, the address bus 1108, the control bus 1110, and the data bus 1112) via the I/O interface 1116. The network interface 1120 communicatively couples the computing system 1100 to one or more networks such as wide area networks (WAN), local area networks (LAN), intranets, the Internet, wireless access networks, wired networks, mobile networks, telephone networks, optical networks, or combinations thereof. The network interface 1120 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1118 is a computer-readable medium, preferably a non-transitory computer-readable medium, comprising one or more programs, the one or more programs comprising instructions which when executed by the processor 1104 cause the computing system 1100 to perform the method steps of the present disclosure. Alternatively, the storage unit 1118 is a transitory computer-readable medium. The storage unit 1118 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1118 stores one or more operating systems, application programs, program modules, data, or any other information. The storage unit 1118 is part of the computing device 1102. Alternatively, the storage unit 1118 is part of one or more other computing machines that are in communication with the computing device 1102, such as servers, database servers, cloud storage, network attached storage, and so forth.

The input controller 1122 may include suitable logic, circuitry, interfaces, and/or code, executable by the circuitry, that may be configured to control one or more input devices that may be configured to receive an input (the stimulus 230) for the overlay system 202. The output controller 1124 may include suitable logic, circuitry, interfaces, and/or code, executable by the circuitry, that may be configured to control one or more output devices that may be configured to render/output the outcome of the operation executed to process the received input (the stimulus 230).

FIG. 12 is a flowchart 1200 of a method for implementing an external system using the overlay system 202, consistent with disclosed embodiments of the present disclosure. Referring to FIG. 12, at 1202, a stimulus is received. The stimulus may be associated with simulation of an object of the external system in the executable graph-based model 100. The processing circuitry (such as the controller module 206 and the stimuli management module 212) may receive the stimulus associated with the simulation of the object of the external system by way of the overlay system 202. Such simulation of the object may be performed for implementing the external system by way of the overlay system 202.

At 1204, a preliminary node for the object may be instantiated in the executable graph-based model 100. The preliminary node may interface the object in the executable graph-based model 100. The preliminary node may be associated with a set of attributes. The processing circuitry (for example, the simulation management module 216) may be configured to instantiate the preliminary node.

At 1206, an object dataset associated with the object may be acquired from the external system. The processing circuitry (such as the controller module 206 and the stimuli management module 212) may be configured to acquire the object dataset associated with the object from the external system.

At 1208, a set of attribute values, associated with the object, may be generated based on the object dataset. The processing circuitry (for example, the simulation management module 216) may be configured to generate the set of attribute values based on the object dataset associated with the object.

At 1210, the set of attribute values associated with the object may be mapped to the set of attributes. The processing circuitry (for example, the simulation management module 216) may be configured to map the set of attribute values associated with the object, to the set of attributes.

At 1212, a simulation overlay node, in association with the preliminary node, may be instantiated in the executable graph-based model 100. The processing circuitry (for example, the simulation management module 216) may be configured to instantiate, in the executable graph-based model 100, the simulation overlay node in association with the preliminary node.

At 1214, the preliminary node may be customized based on the association with the simulation overlay node. The preliminary node may be customized by modifying a node structure thereof. The node structure of the preliminary node may be modified based on a node-type of the simulation overlay node. The processing circuitry (for example, the simulation management module 216) may be configured to customize the preliminary node based on the association with the simulation overlay node. In order to customize the preliminary node, the processing circuitry (for example, the simulation management module 216) may be configured to modify the node structure of the preliminary node in accordance with a node-type of the simulation overlay node.

At 1216, based on the customization of the preliminary node, a simulated node simulating the object in the executable graph-based model 100 may be generated. The processing circuitry (for example, the simulation management module 216) may be configured to generate the simulated node simulating the object in the executable graph-based model 100. Similarly, the processing circuitry may be configured to simulate one or more remaining objects by generating one or more additional simulated nodes in the executable graph-based model 100. Based on the simulation of the object and the one or more remaining objects, the processing circuitry may be configured to implement the external system by way of the overlay system 202.

The disclosed embodiments encompass numerous advantages including a simple and user-friendly implementation of the executable graph-based model 100 that may be in turn used to implement various external systems by way of the overlay system 202. The disclosed systems and methods allow for simulation of objects associated with the external systems in the executable graph-based model 100. Such simulation of the objects allows for the implementation of the external systems by way of the overlay system 202. The implementation allows various technologies implemented by the external systems to take advantage of features of the overlay system 202. Such features may include significantly increased throughput and efficiency and significantly reduced cost complexity, processing complexity, time complexity, latency, waiting time, turnaround time, or the like.

The external systems are implemented by way of the overlay system 202 by simulating the objects of the external systems in the executable graph-based model 100. The disclosed methods and systems allow for an efficient process of simulating the objects of the external systems in the executable graph-based model 100. An object may be simulated by a corresponding simulated node such that the simulated node is generated based on a preliminary node that interfaces the object in the overlay system 202. Therefore, the object is not modified in any way for simulation thereof in the executable graph-based model 100. This allows the object to maintain its integral structure. Further, the associations among the objects of the external systems get reflected in the executable graph-based model 100 based on similar associations among corresponding simulated nodes. In addition, the object dataset associated with each object gets mapped to the corresponding simulated node. Therefore, the disclosed systems and methods ensure that there is no loss of information while implementing the external system by way of the overlay system 202.

The objects of the external systems may be simulated as a single unit or as a composite structure. This facilitates the possibility for operational modifications while implementing the external systems by way of the overlay system 202. Such operational modifications may be performed to achieve optimal utilization of various features of the overlay system 202. Also, implementation of an object as a separate simulated node allows the object to have a sovereign identity while providing operational independence and reusability to the simulated node. Moreover, the disclosed systems and methods provide a flexible structure of the executable graph-based model 100 that may be scaled up (by increasing a number of nodes in the executable graph-based model 100) or scaled down (by decreasing the number of nodes in the executable graph-based model 100) to accommodate any changes in the external systems.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating simulation of objects of an external system in executable graph-based models using simulated nodes and simulation overlay nodes. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:

a storage element configured to store an executable graph-based model; and processing circuitry that is coupled to the storage element, and configured to:

receive a first stimulus associated with simulation of a first object of an external system in the executable graph-based model;

instantiate, in the executable graph-based model, a first preliminary node for the first object, wherein the first preliminary node interfaces the first object in the executable graph-based model, and wherein the first preliminary node is associated with a first set of attributes;

map, to the first set of attributes, a first set of attribute values associated with the first object;

instantiate, in association with the first preliminary node, a first simulation overlay node in the executable graph-based model;

customize the first preliminary node based on the association with the first simulation overlay node; and generate, based on the customization of the first preliminary node, a first simulated node simulating the first object in the executable graph-based model.

2. The overlay system of 1, wherein to customize the first preliminary node, the processing circuitry is further configured to modify a node structure of the first preliminary node based on the first simulation overlay node.

3. The overlay system of 2, wherein based on the first simulation overlay node being a vertex node-type overlay node, the node structure of the first preliminary node is modified to match a vertex node-type, wherein based on the first simulation overlay node being an edge node-type overlay node, the node structure of the first preliminary node is modified to match an edge node-type, wherein based on the first simulation overlay node being a role node-type overlay node, the node structure of the first preliminary node is modified to match a role node-type, wherein based on the first simulation overlay node being an overlay node-type overlay node, the node structure of the first preliminary node is modified to match an overlay node-type, wherein based on the first simulation overlay node being an attribute node-type overlay node, the node structure of the first preliminary node is modified to match an attribute object, and wherein based on the first simulation overlay node being an attribute edge node-type overlay node, the node structure of the first preliminary node is modified to match an attribute edge.

4. The overlay system of 2, wherein the node structure of the first preliminary node is modified based on a node-type of the first simulation overlay node.

5. The overlay system of 1, wherein based on the association of the first simulation overlay node with the first preliminary node, the first simulation overlay node is associated with the first simulated node.

6. The overlay system of 5, wherein the first simulated node includes a first overlay manager that manages the association of the first simulation overlay node with the first simulated node.

7. The overlay system of 1, wherein the processing circuitry is further configured to: acquire a first object dataset associated with the first object from the external system; and generate the first set of attribute values associated with the first object based on the first object dataset.

8. The overlay system of 7, wherein the first object is at least one of a group consisting of a data object or a function object, wherein based on the first object being the data object, the first object dataset pertains to non-executable data associated with the first object, and wherein based on the first object being the function object, the first object dataset pertains to processing logic associated with the first object.

9. The overlay system of 8, wherein based on the first object being the data object, the first simulation overlay node is one of a group consisting of: a vertex node-type overlay node, an edge node-type overlay node, a role node-type overlay node, an attribute overlay node, or an attribute edge overlay node, and wherein based on the first object being the function object, the first simulation overlay node is an overlay node-type overlay node.

10. The overlay system of 7, wherein the processing circuitry is further configured to:

determine a data organization schema associated with the external system;

generate a first data template based on the data organization schema;

generate a second data template based on a schema associated with the overlay system; and map the first data template with the second data template, and wherein the first set of attribute values is generated further based on the mapping between the first data template and the second data template.

11. The overlay system of 7, wherein the generation of the first set of attribute values is further based on a schema of the overlay system.

12. The overlay system of 7, wherein the processing circuitry is further configured to:

receive a second stimulus associated with the first object, wherein an operation associated with the second stimulus is to be executed based on the first object dataset associated with the first object;

identify, based on the mapping with the first set of attributes, the first set of attribute values; and execute the operation associated with the second stimulus based on the first set of attribute values.

13. The overlay system of 1, wherein the first simulation overlay node is one of a group consisting of: a vertex node-type overlay node, an edge node-type overlay node, a role node-type overlay node, an overlay node-type overlay node, an attribute overlay node, or an attribute edge overlay node, and wherein the first simulated node is one of a group consisting of: a simulated vertex node, a simulated edge node, a simulated role node, a simulated overlay node, a simulated attribute object, or a simulated attribute edge.

14. The overlay system of 13, wherein based on the first simulation overlay node being the vertex node-type overlay node, the first simulated node is the simulated vertex node, wherein based on the first simulation overlay node being the edge node-type overlay node, the first simulated node is the simulated edge node, wherein based on the first simulation overlay node being the role node-type overlay node, the first simulated node is the simulated role node, wherein based on the first simulation overlay node being the overlay node-type overlay node, the first simulated node is the simulated overlay node, wherein based on the first simulation overlay node being the attribute overlay node, the first simulated node is the simulated attribute object, and wherein based on the first simulation overlay node being the attribute edge overlay node, the first simulated node is the simulated attribute edge.

15. The overlay system of 1, wherein the processing circuitry is further configured to:

instantiate, in the executable graph-based model, a set of function overlay nodes; and associate the set of function overlay nodes with at least one of a group consisting of the first simulated node or the first simulation overlay node, to extend a functionality thereof.

16. The overlay system of 15, wherein the first simulated node includes a first overlay manager that manages the association of the set of function overlay nodes with the first simulated node.

17. The overlay system of 15, wherein the first simulation overlay node includes a second overlay manager that manages the association of the set of function overlay nodes with the first simulation overlay node.

18. The overlay system of 1, wherein the processing circuitry is further configured to generate a second set of attribute values for a second set of attributes associated with the first simulated node, wherein the second set of attribute values conforms to a schema of the overlay system, wherein the second set of attribute values is generated based on a set of data organization constraints associated with the schema of the overlay system, and wherein the first set of attributes and the second set of attributes, collectively, constitute the first simulated node.

19. The overlay system of 1, wherein the first object corresponds to one of a group consisting of a single entity or a group of entities.

20. The overlay system of 1, wherein the first simulated node includes one of a group consisting of a single preliminary node or a group of preliminary nodes.

21. The overlay system of 1, wherein the first simulated node is one of a group consisting of a stateful node or a stateless node.

22. The overlay system of 21, wherein based on the first simulated node being the stateful node, the first simulated node is persistent such that at least one of a group consisting of data or processing logic, associated with the first simulated node persists in the storage element, and wherein based on the first simulated node being the stateless node, the first simulated node is non-persistent such that at least one of the group consisting of the data or the processing logic, associated with the first simulated node ceases to exist based on an unloading of the first simulated node.

23. The overlay system of 1, wherein the processing circuitry is further configured to unload the first simulated node from the executable graph-based model based on an expiration of an idle time-interval threshold associated with the first simulated node, and wherein the idle time-interval threshold corresponds to a maximum time period for which the first simulated node remains unutilized.

24. The overlay system of 1, wherein the processing circuitry is further configured to:

identify a second object associated with the first object;

generate, based on the association of the second object with the first object, a second simulated node for the second object; and associate the second simulated node with the first simulated node.

25. The overlay system of 24, wherein the first object and the second object have a first object dataset and a second object dataset, respectively, associated therewith, and wherein the second simulated node is associated with the first simulated node based on an association of the second object dataset with the first object dataset.

26. The overlay system of 24, wherein the second simulated node is associated with the first simulated node further based on one of a group consisting of (i) the first object inheriting the second object or (ii) the first object being dependent on the second object.

27. The overlay system of 26, wherein based on the first object inheriting the second object, the first simulated node inherits the second simulated node, and wherein based on the first object being dependent on the second object, the first simulated node is dependent on the second simulated node.

28. The overlay system of 24, wherein based on unloading of the first simulated node, the processing circuitry is further configured to unload the second simulated node from the executable graph-based model.

29. The overlay system of 24, wherein the processing circuitry is further configured to:

generate a composite structure encompassing the first simulated node and the second simulated node based on the association between the first simulated node and the second simulated node; and instantiate, based on the first simulated node being encompassed within the composite structure, a group overlay node associated with the first simulated node, wherein the association of the group overlay node with the first simulated node facilitates the inclusion of the first simulated node in the composite structure.

30. The overlay system of 29, wherein the processing circuitry is further configured to:

receive a third stimulus associated with the first simulated node; and execute an operation associated with the first simulated node based on the composite structure.

31. The overlay system of 29, wherein the group overlay node is one of a group consisting of a leaf group overlay node or a composite overlay node.

32. The overlay system of 29, wherein the composite structure corresponds to a hierarchical structure, wherein based on the first simulated node being a leaf node in the hierarchical structure, the group overlay node corresponds to a leaf group overlay node, and wherein based on the first simulated node being a parent node in the hierarchical structure, the group overlay node corresponds to a composite overlay node.

33. The overlay system of 29, wherein the processing circuitry is further configured to instantiate a contract overlay node associated with the composite structure, and wherein the contract overlay node implements access control associated with the composite structure.

34. The overlay system of 33, wherein the access control associated with the composite structure corresponds to one of a group consisting of public access, private access, or protected access.

35. The overlay system of 1, wherein the processing circuitry is further configured to:

receive a fourth stimulus associated with the first simulated node;

determine whether the first simulated node is loaded in the executable graph-based model;

load, based on the first simulated node being unloaded from the executable graph-based model, the first simulated node and a set of simulated nodes associated with the first simulated node in the executable graph-based model; and execute an operation associated with the fourth stimulus based on the first simulated node and the set of simulated nodes.

36. The overlay system of 1, wherein the first simulated node is one of a group consisting of a mutable node or an immutable node.

37. The overlay system of 1, wherein the processing circuitry is further configured to generate one or more additional simulated nodes simulating one or more remaining objects of the external system, respectively, in the executable graph-based model, and wherein the generation of the first simulated node and the one or more additional simulated nodes facilitates an implementation of the external system using the executable graph-based model.

38. A method, comprising:

receiving, by processing circuitry of an overlay system, a stimulus associated with simulation of an object of an external system in an executable graph-based model;

instantiating, by the processing circuitry, in the executable graph-based model, a preliminary node for the object, wherein the preliminary node interfaces the object in the executable graph-based model, and wherein the preliminary node is associated with a set of attributes;

mapping, by the processing circuitry, a set of attribute values associated with the object to the set of attributes;

instantiating, by the processing circuitry, in association with the preliminary node, a simulation overlay node in the executable graph-based model;

customizing, by the processing circuitry, the preliminary node based on the association with the simulation overlay node; and generating, by the processing circuitry, based on the customization of the preliminary node, a simulated node simulating the object in the executable graph-based model.

What is claimed is:

1. An overlay system, comprising:

a storage element configured to store an executable graph-based model; and processing circuitry that is coupled to the storage element, and configured to:

receive a first stimulus associated with simulation of a first object of an external system in the executable graph-based model;

instantiate, in the executable graph-based model, a first preliminary node for the first object, wherein the first preliminary node interfaces the first object in the executable graph-based model, and wherein the first preliminary node is associated with a first set of attributes;

map, to the first set of attributes, a first set of attribute values associated with the first object;

instantiate, in association with the first preliminary node, a first simulation overlay node in the executable graph-based model;

customize the first preliminary node based on the association with the first simulation overlay node; and generate, based on the customization of the first preliminary node, a first simulated node simulating the first object in the executable graph-based model.

2. The overlay system of claim 1, wherein to customize the first preliminary node, the processing circuitry is further configured to modify a node structure of the first preliminary node based on the first simulation overlay node, wherein based on the first simulation overlay node being a vertex node-type overlay node, the node structure of the first preliminary node is modified to match a vertex node-type, wherein based on the first simulation overlay node being an edge node-type overlay node, the node structure of the first preliminary node is modified to match an edge node-type, wherein based on the first simulation overlay node being a role node-type overlay node, the node structure of the first preliminary node is modified to match a role node-type, wherein based on the first simulation overlay node being an overlay node-type overlay node, the node structure of the first preliminary node is modified to match an overlay node-type, wherein based on the first simulation overlay node being an attribute node-type overlay node, the node structure of the first preliminary node is modified to match an attribute object, and wherein based on the first simulation overlay node being an attribute edge node-type overlay node, the node structure of the first preliminary node is modified to match an attribute edge.

3. The overlay system of claim 1, wherein the processing circuitry is further configured to:

acquire a first object dataset associated with the first object from the external system; and generate the first set of attribute values associated with the first object based on the first object dataset.

4. The overlay system of claim 3, wherein the processing circuitry is further configured to:

determine a data organization schema associated with the external system;

generate a first data template based on the data organization schema;

generate a second data template based on a schema associated with the overlay system; and map the first data template with the second data template, and wherein the first set of attribute values is generated further based on the mapping between the first data template and the second data template.

5. The overlay system of claim 3, wherein the generation of the first set of attribute values is further based on a schema of the overlay system.

6. The overlay system of claim 3, wherein the processing circuitry is further configured to:

receive a second stimulus associated with the first object, wherein an operation associated with the second stimulus is to be executed based on the first object dataset associated with the first object;

identify, based on the mapping with the first set of attributes, the first set of attribute values; and execute the operation associated with the second stimulus based on the first set of attribute values.

7. The overlay system of claim 3, wherein the first object is at least one of a group consisting of a data object or a function object, wherein based on the first object being the data object, the first object dataset pertains to non-executable data associated with the first object, and wherein based on the first object being the function object, the first object dataset pertains to processing logic associated with the first object.

8. The overlay system of claim 7, wherein based on the first object being the data object, the first simulation overlay node is one of a group consisting of: a vertex node-type overlay node, an edge node-type overlay node, a role node-type overlay node, an attribute overlay node, or an attribute edge overlay node, and wherein based on the first object being the function object, the first simulation overlay node is an overlay node-type overlay node.

9. The overlay system of claim 1, wherein the first simulation overlay node is one of a group consisting of: a vertex node-type overlay node, an edge node-type overlay node, a role node-type overlay node, an overlay node-type overlay node, an attribute overlay node, or an attribute edge overlay node, and wherein the first simulated node is one of a group consisting of: a simulated vertex node, a simulated edge node, a simulated role node, a simulated overlay node, a simulated attribute object, or a simulated attribute edge.

10. The overlay system of claim 9, wherein based on the first simulation overlay node being the vertex node-type overlay node, the first simulated node is the simulated vertex node, wherein based on the first simulation overlay node being the edge node-type overlay node, the first simulated node is the simulated edge node, wherein based on the first simulation overlay node being the role node-type overlay node, the first simulated node is the simulated role node, wherein based on the first simulation overlay node being the overlay node-type overlay node, the first simulated node is the simulated overlay node, wherein based on the first simulation overlay node being the attribute overlay node, the first simulated node is the simulated attribute object, and wherein based on the first simulation overlay node being the attribute edge overlay node, the first simulated node is the simulated attribute edge.

11. The overlay system of claim 1, wherein the processing circuitry is further configured to unload the first simulated node from the executable graph-based model based on an expiration of an idle time-interval threshold associated with the first simulated node, and wherein the idle time-interval threshold corresponds to a maximum time period for which the first simulated node remains unutilized.

12. The overlay system of claim 1, wherein the processing circuitry is further configured to:

identify a second object associated with the first object;

generate, based on the association of the second object with the first object, a second simulated node for the second object; and associate the second simulated node with the first simulated node.

13. The overlay system of claim 12, wherein the first object and the second object have a first object dataset and a second object dataset, respectively, associated therewith, and wherein the second simulated node is associated with the first simulated node based on an association of the second object dataset with the first object dataset.

14. The overlay system of claim 12, wherein the second simulated node is associated with the first simulated node further based on one of a group consisting of (i) the first object inheriting the second object or (ii) the first object being dependent on the second object, wherein based on the first object inheriting the second object, the first simulated node inherits the second simulated node, and wherein based on the first object being dependent on the second object, the first simulated node is dependent on the second simulated node.

15. The overlay system of claim 12, wherein the processing circuitry is further configured to:

generate a composite structure encompassing the first simulated node and the second simulated node based on the association between the first simulated node and the second simulated node; and instantiate, based on the first simulated node being encompassed within the composite structure, a group overlay node associated with the first simulated node, wherein the association of the group overlay node with the first simulated node facilitates the inclusion of the first simulated node in the composite structure.

16. The overlay system of claim 15, wherein the processing circuitry is further configured to:

receive a third stimulus associated with the first simulated node; and execute an operation associated with the first simulated node based on the composite structure.

17. The overlay system of claim 15, wherein the group overlay node is one of a group consisting of a leaf group overlay node or a composite overlay node, wherein the composite structure corresponds to a hierarchical structure, wherein based on the first simulated node being a leaf node in the hierarchical structure, the group overlay node corresponds to the leaf group overlay node, and wherein based on the first simulated node being a parent node in the hierarchical structure, the group overlay node corresponds to the composite overlay node.

18. The overlay system of claim 15, wherein the processing circuitry is further configured to instantiate a contract overlay node associated with the composite structure,

wherein the contract overlay node implements access control associated with the composite structure, and wherein the access control associated with the composite structure corresponds to one of a group consisting of public access, private access, or protected access.

19. The overlay system of claim 1, wherein the processing circuitry is further configured to generate one or more additional simulated nodes simulating one or more remaining objects of the external system, respectively, in the executable graph-based model, and wherein the generation of the first simulated node and the one or more additional simulated nodes facilitates an implementation of the external system using the executable graph-based model.

20. A method, comprising:

receiving, by processing circuitry of an overlay system, a stimulus associated with simulation of an object of an external system in an executable graph-based model;

instantiating, by the processing circuitry, in the executable graph-based model, a preliminary node for the object, wherein the preliminary node interfaces the object in the executable graph-based model, and wherein the preliminary node is associated with a set of attributes;

mapping, by the processing circuitry, a set of attribute values, associated with the object, to the set of attributes;

instantiating, by the processing circuitry, in association with the preliminary node, a simulation overlay node in the executable graph-based model;

customizing, by the processing circuitry, the preliminary node based on the association with the simulation overlay node; and generating, by the processing circuitry, based on the customization of the preliminary node, a simulated node simulating the object in the executable graph-based model.

* * * * *